US012494761B2

(12) United States Patent
Miyazaki et al.

(10) Patent No.: US 12,494,761 B2
(45) Date of Patent: Dec. 9, 2025

(54) DIRECTIONAL COUPLER, HIGH-FREQUENCY MODULE, AND COMMUNICATION DEVICE

(71) Applicant: Murata Manufacturing Co., Ltd., Kyoto (JP)

(72) Inventors: Yuuta Miyazaki, Kyoto (JP); Katsuya Shimizu, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 164 days.

(21) Appl. No.: 18/482,199

(22) Filed: Oct. 6, 2023

(65) Prior Publication Data
US 2024/0128946 A1  Apr. 18, 2024

(30) Foreign Application Priority Data

Oct. 14, 2022  (JP) .................. 2022-165877

(51) Int. Cl.
*H01P 5/18* (2006.01)
*H03H 7/06* (2006.01)
*H03H 7/46* (2006.01)
*H04B 1/44* (2006.01)

(52) U.S. Cl.
CPC .............. *H03H 7/06* (2013.01); *H01P 5/18* (2013.01); *H01P 5/184* (2013.01); *H03H 7/46* (2013.01); *H04B 1/44* (2013.01)

(58) Field of Classification Search
CPC .... H01P 5/12; H01P 5/18; H01P 5/187; H01P 5/184; H01P 5/185; H01P 5/16; H01P 5/183; H01P 5/186
See application file for complete search history.

(56) References Cited

U.S. PATENT DOCUMENTS

| | | | |
|---|---|---|---|
| 2016/0381686 A1* | 12/2016 | Isoyama | H04L 5/001 370/329 |
| 2018/0062672 A1 | 3/2018 | Kim | |
| 2020/0076045 A1* | 3/2020 | Seki | H04B 1/006 |
| 2024/0347890 A1* | 10/2024 | Seki | H01P 5/18 |

FOREIGN PATENT DOCUMENTS

JP     2018037780 A     3/2018

* cited by examiner

*Primary Examiner* — Stephen E. Jones
(74) *Attorney, Agent, or Firm* — McDonald Hopkins LLC

(57) ABSTRACT

A directional coupler includes a main line, a sub-line, an output terminal, a first termination circuit, and a termination switch. The sub-line includes a first end and a second end. The output terminal is connected to one end of the first end and the second end. The first termination circuit connects a first output path, which connects the one end and the output terminal, to a ground. The termination switch switches between connection and non-connection between the first output path and the first termination circuit.

14 Claims, 11 Drawing Sheets

DIRECTIONAL COUPLER, HIGH-FREQUENCY MODULE, AND COMMUNICATION DEVICE

CROSS REFERENCE TO RELATED APPLICATION

This application claims priority from Japanese Patent Application No. 2022-165877 filed on Oct. 14, 2022. The content of this application is incorporated herein by reference in its entirety.

BACKGROUND OF THE DISCLOSURE

1. Field of the Disclosure

The present disclosure relates to a directional coupler, a high-frequency module, and a communication device, and in more detail, to a directional coupler that includes a main line and a sub-line, a high-frequency module that includes the directional coupler, and a communication device that includes the high-frequency module.

2. Description of the Related Art

Japanese Unexamined Patent Application Publication No. 2018-37780 discloses a bidirectional coupler that includes a main line, a sub-line, a first resistor and a second resistor, and a first switch and a second switch. The first switch connects one end of the sub-line to a detection port or the first resistor. The second switch connects the other end of the sub-line to the detection port or the second resistor. The first resistor has one end connected to the ground and the other end connected to the first switch. The second resistor has one end connected to the ground and the other end connected to the second switch. In this bidirectional coupler, for the detection of a signal supplied from an input port of the main line, the second switch is switched to the detection port side, and the first switch is switched to the first resistor side. On the other hand, in this bidirectional coupler, for the detection of a signal supplied from an output port of the main line, the first switch is switched to the detection port side, and the second switch is switched to the second resistor side.

BRIEF SUMMARY OF THE DISCLOSURE

In the bidirectional coupler described in Japanese Unexamined Patent Application Publication No. 2018-37780, in a case where the sub-line and the detection port are not connected, the first switch is connected to neither the detection port nor the first resistor, and the second switch is also connected to neither the detection port nor the second resistor. For this reason, the sub-line is in an open state of being not connected to any circuits. Even though the sub-line is in the open state, a part of a signal transmitted on the main line may leak from the main line to the sub-line in the open state, and signal loss may occur. In this case, the impedance on the sub-line side as viewed from the main line side is different between a case (during non-detection) where the sub-line is in the open state and a case (during detection) where the sub-line is connected to the detection port. Therefore, the insertion loss of the main line and a signal phase may be different between a case where the sub-line is in the open state and a case where the sub-line is connected to the detection port.

It is a possible benefit of the present disclosure to provide a directional coupler, a high-frequency module, and a communication device that can reduce the change in the insertion loss of a main line and the change in the signal phase between during detection and during non-detection.

A directional coupler according to an aspect of the present disclosure includes a main line, a sub-line, an output terminal, a first termination circuit, and a termination switch. The sub-line includes a first end and a second end. The output terminal is connected to one end of the first end and the second end. The first termination circuit connects a first output path, which connects the one end and the output terminal, to a ground. The termination switch switches between connection and non-connection between the first output path and the first termination circuit.

A high-frequency module according to an aspect of the present disclosure includes the directional coupler, an antenna terminal, a plurality of filters, and an antenna switch. The antenna switch switches between connection and non-connection between a signal path to the antenna terminal and the plurality of filters.

A communication device according to an aspect of the present disclosure includes the high-frequency module, and a signal processing circuit. The signal processing circuit is connected to the high-frequency module and executes signal processing on a high-frequency signal.

With the directional coupler, the high-frequency module, and the communication device according to the aspects of the present disclosure, it is possible to reduce the change in the insertion loss of the main line and the change in the signal phase between during detection and during non-detection.

DETAILED DESCRIPTION OF THE DISCLOSURE

Figure 16:
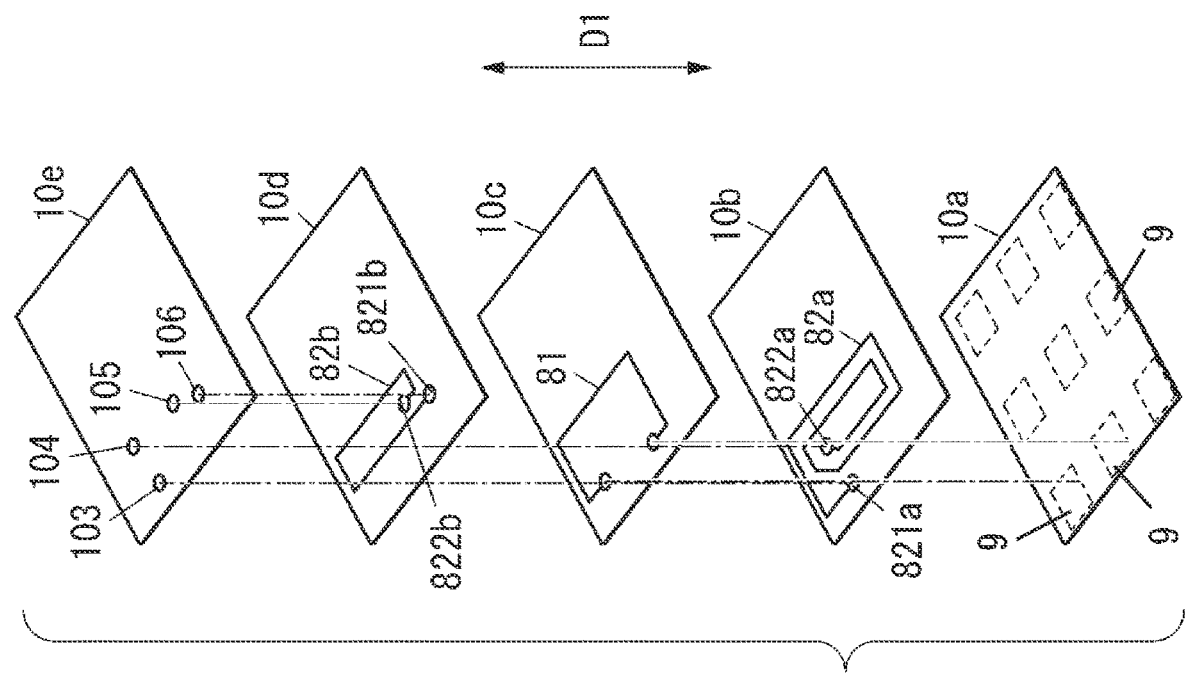
FIG. 16 is a perspective view of the high-frequency module.
Figure 16:
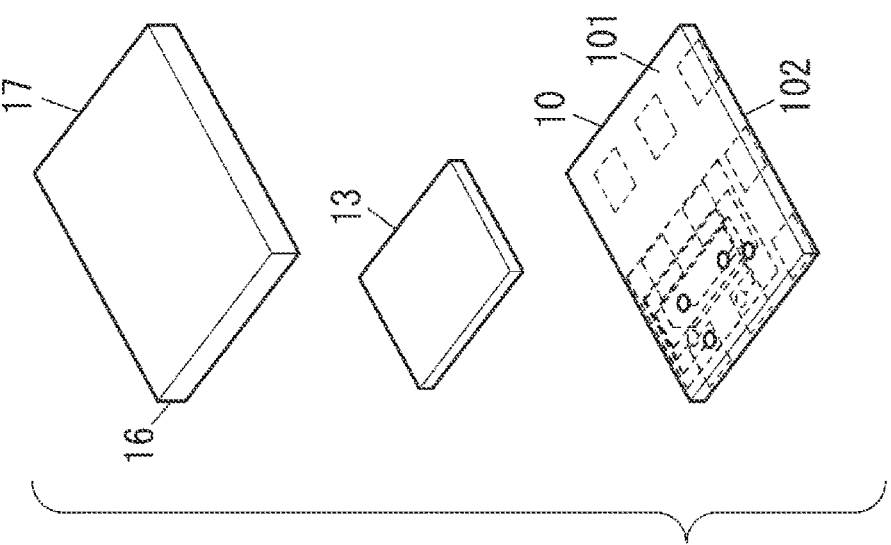
Figure 16:
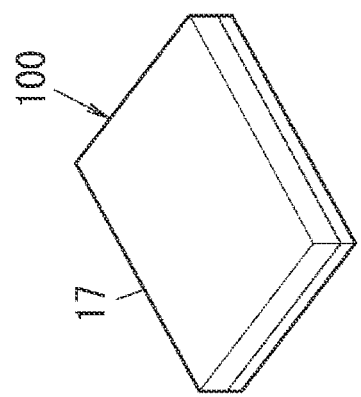
Figure 17:
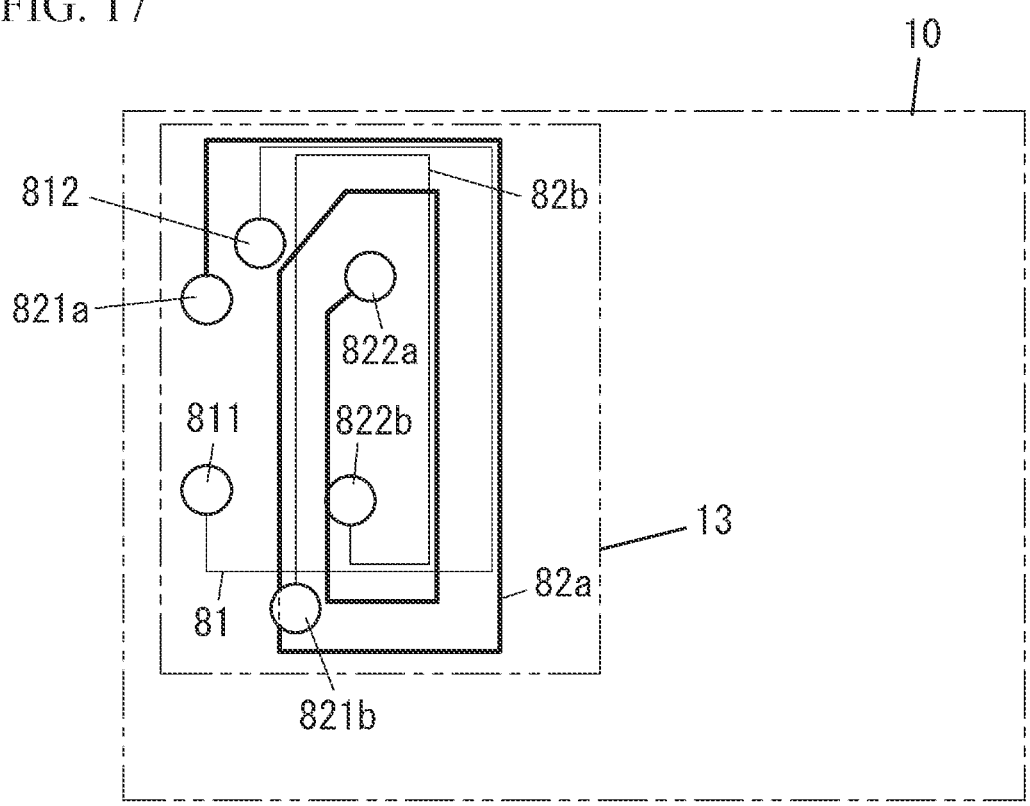
FIG. 17 is a plan view illustrating a positional relationship between an IC chip and each of a main line, a first sub-line, and a second sub-line in the high-frequency module.

FIGS. 16 and 17 that will be referenced in the following embodiments and the like are both schematic diagrams, and ratios of sizes and thicknesses of constituent elements in the drawings do not always reflect actual scale ratios.

Embodiment 1

1 Configuration of Directional Coupler

The configuration of a directional coupler 8 according to Embodiment 1 will be described with reference to FIGS. 1 to 6.

Figure 1:
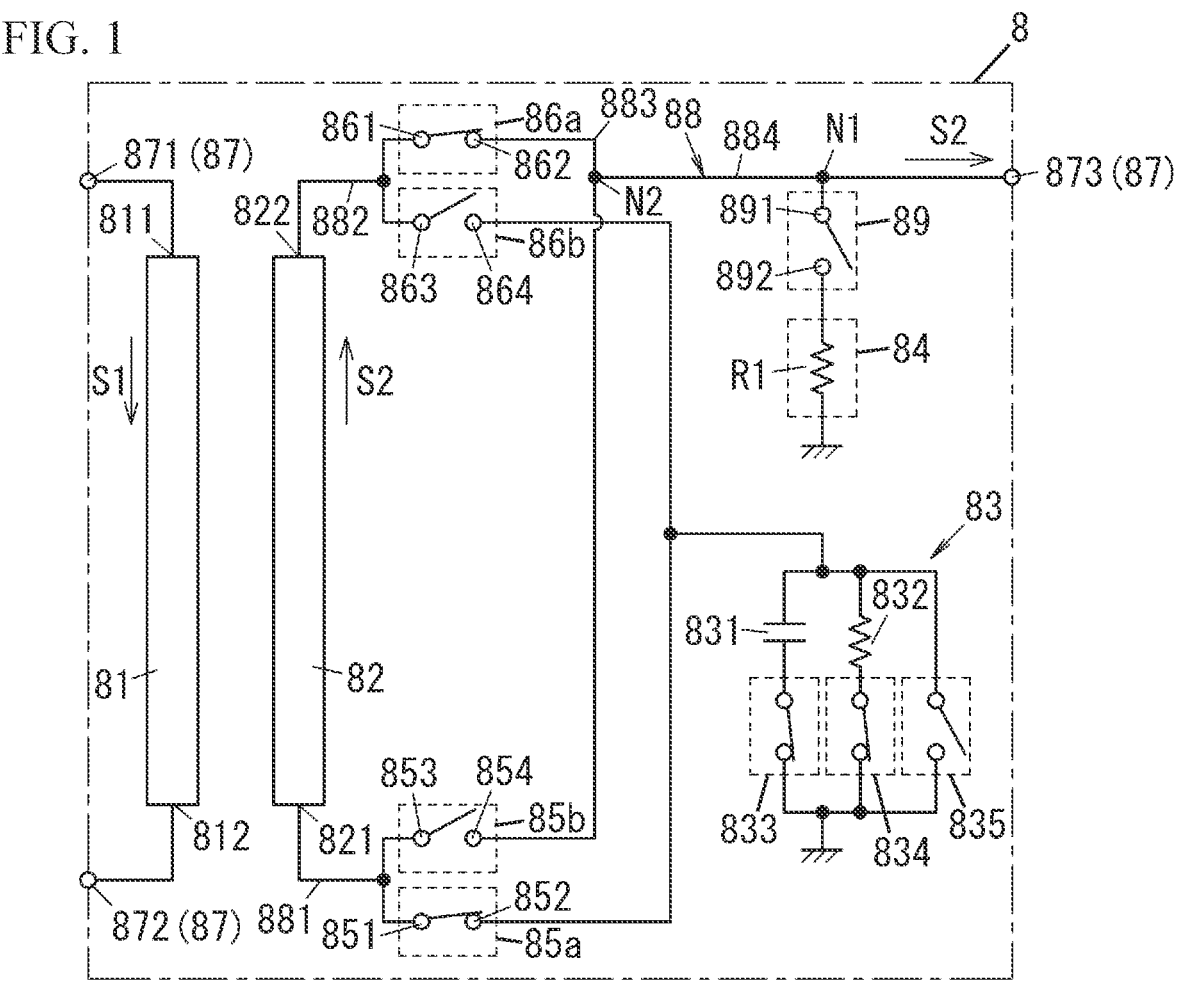
FIG. 1 is a circuit diagram illustrating a first mode of a directional coupler according to Embodiment 1.

The directional coupler 8 according to Embodiment 1 is used in, for example, a high-frequency module of a communication device. As illustrated in FIG. 1, the directional coupler 8 is a device that extracts, as a detection signal, a part of a high-frequency signal transmitted on a partial section (main line 81) of a signal path in a high-frequency module from a sub-line 82. The high-frequency signal transmitted on the main line 81 can be monitored by monitoring the detection signal. The directional coupler 8 according to Embodiment 1 is a bidirectional coupler configured to detect a high-frequency signal (forward signal) by extracting a detection signal from a first end of the sub-line 82 and to detect a reflected signal (backward signal) by extracting a detection signal from a second end of the sub-line 82.

The directional coupler 8 includes the main line 81, the sub-line 82, a first termination circuit 84 (termination circuit), a second termination circuit 83, a first selection switch 85a, a second selection switch 85b, a third selection switch 86a, a fourth selection switch 86b, and a termination switch 89. The directional coupler 8 further includes a plurality (in the example illustrated in the drawing, three) of connection terminals 87. The plurality of connection terminals 87 include a first connection terminal 871, a second connection terminal 872, and a third connection terminal 873.

1.1 Connection Terminal

The first connection terminal 871 and the second connection terminal 872 are input/output terminals for inputting and outputting the high-frequency signal transmitted on the main line 81. The first connection terminal 871 is connected to a first end 811 of the main line 81. The second connection terminal 872 is connected to a second end 812 of the main line 81. The third connection terminal 873 is an output terminal for outputting a detection signal detected by the sub-line 82. The third connection terminal 873 is selectively connected to any one of a first end 821 and a second end 822 of the sub-line 82.

1.2 Main Line

The main line 81 has the first end 811 and the second end 812 that are both ends of the main line 81 in a longitudinal direction. The first end 811 of the main line 81 is connected to, for example, an antenna terminal of a high-frequency module via the first connection terminal 871. The second end 812 of the main line 81 is connected to, for example, a transmission circuit, a reception circuit, or a transmission and reception circuit of the high-frequency module via the second connection terminal 872.

1.3 Sub-Line

The sub-line 82 has the first end 821 and the second end 822 that are both ends of the sub-line 82 in a longitudinal direction. The first end 821 of the sub-line 82 is connected to the first selection switch 85a and the second selection switch 85b. In more detail, the first end 821 of the sub-line 82 is connected to a terminal 851 described below of the first selection switch 85a and a terminal 853 described below of the second selection switch 85b. The second end 822 of the sub-line 82 is connected to the third selection switch 86a and the fourth selection switch 86b. In more detail, the second end 822 of the sub-line 82 is connected to a terminal 861 described below of the third selection switch 86a and a terminal 863 described below of the fourth selection switch 86b. The sub-line 82 is coupled to the main line 81 in terms of an electromagnetic field, for example.

1.4 Second Termination Circuit

The second termination circuit 83 is a circuit that terminates the first end 821 or the second end 822 of the sub-line 82 in a first mode or a second mode where a signal transmitted on the main line 81 is detected using the sub-line 82. The first mode is a detection mode of detecting a signal (forward signal) transmitted in the main line 81 from the first end 811 to the second end 812 of the main line 81. The second mode is a detection mode of detecting a signal (backward signal) transmitted in the main line 81 from the second end 812 to the first end 811 of the main line 81. The second termination circuit 83 is connected between a terminal 852 described below of the first selection switch 85a and a terminal 864 described below of the fourth selection switch 86b, and a ground.

The second termination circuit 83 is, for example, a circuit in which a capacitor 831 and a resistor 832 are connected in parallel. The second termination circuit 83 has, for example, a switch 833, a switch 834, and a switch 835. The switch 833 is connected between the capacitor 831 and the ground, and switches between connection (short-circuit state) and non-connection (open state) between the capacitor 831 and the ground. The switch 834 is connected between the resistor 832 and the ground, and switches between connection and non-connection between the resistor 832 and the ground. The switch 835 is connected between a terminal 852 described below of the first selection switch 85a and a terminal 864 described below of the fourth selection switch 86b, and the ground, and switches between connection and non-connection between the terminal 852 of the first selection switch 85a and the terminal 864 of the fourth selection switch 86b, and the ground.

1.5 First Selection Switch and Second Selection Switch

The first selection switch 85a and the second selection switch 85b are switches for switching a connection destination of the first end 821 of the sub-line 82 to the second termination circuit 83 or the third connection terminal 873. The first selection switch 85a has two terminals 851 and 852. The terminal 851 is connected to the first end 821 of the sub-line 82. The terminal 852 is connected to the second termination circuit 83. The second selection switch 85b has two terminals 853 and terminal 854. The terminal 853 is connected to the first end 821 of the sub-line 82. The terminal 854 is connected to the third connection terminal 873.

In each of the first selection switch 85*a* and the second selection switch 85*b*, in a case where the second end 822 of the sub-line 82 is connected to one of the third connection terminal 873 and the second termination circuit 83, connection and non-connection are switched in such a manner to connect the first end 821 of the sub-line 82 to the other of the third connection terminal 873 and the second termination circuit 83.

In more detail, the first selection switch 85*a* switches between a first state of connecting the terminal 851 and the terminal 852 and a second state of disconnecting the terminal 851 and the terminal 852. The first selection switch 85*a* connects the terminal 851 and the terminal 852 in the first mode and a third mode, and disconnects the terminal 851 and the terminal 852 in the second mode.

The second selection switch 85*b* switches a first state of connecting the terminal 853 and the terminal 854 and a second state of connecting the terminal 853 and the terminal 854. The second selection switch 85*b* connects the terminal 853 and the terminal 854 in the second mode, and disconnects the terminal 853 and the terminal 854 in the first mode and the third mode.

Thus, in the first mode and the third mode, the first end 821 of the sub-line 82 is connected to the second termination circuit 83. In the second mode, the first end 821 of the sub-line 82 is connected to the third connection terminal 873.

1.6 Third Selection Switch and Fourth Selection Switch

The third selection switch 86*a* and the fourth selection switch 86*b* are switches for switching a connection destination of the second end 822 of the sub-line 82 to the third connection terminal 873 or the second termination circuit 83. The third selection switch 86*a* has two terminals 861 and 862. The terminal 861 is connected to the second end 822 of the sub-line 82. The terminal 862 is connected to the third connection terminal 873. The fourth selection switch 86*b* has two terminals 863 and 864. The terminal 863 is connected to the second end 822 of the sub-line 82. The terminal 864 is connected to the second termination circuit 83.

In each of the third selection switch 86*a* and the fourth selection switch 86*b*, in a case where the first end 821 of the sub-line 82 is connected to one of the third connection terminal 873 and the second termination circuit 83, connection and non-connection are switched in such a manner to connect the second end 822 of the sub-line 82 to the other of the third connection terminal 873 and the second termination circuit 83.

In more detail, the third selection switch 86*a* switches between a first state of connecting the terminal 861 and the terminal 862 and a second state of disconnecting the terminal 861 and the terminal 862. The third selection switch 86*a* connects the terminal 861 and the terminal 862 in the first mode and the third mode, and disconnects the terminal 861 and the terminal 862 in the second mode.

The fourth selection switch 86*b* switches between a first state of connecting the terminal 863 and the terminal 864 and a second state of disconnecting the terminal 863 and the terminal 864. The fourth selection switch 86*b* connects the terminal 863 and the terminal 864 in the second mode, and disconnects the terminal 863 and the terminal 864 in the first mode and the third mode.

Thus, in the first mode and the third mode, the second end 822 of the sub-line 82 is connected to the third connection terminal 873. In the second mode, the second end 822 of the sub-line 82 is connected to the second termination circuit 83.

1.7 First Termination Circuit

The first termination circuit 84 is a circuit that terminates the third connection terminal 873 (that is, terminates the sub-line 82) in the third mode where detection is not performed. In more detail, the first termination circuit 84 is a pseudo termination circuit for adjusting the impedance on the sub-line 82 side viewed from the main line 81 side (a signal transmitted on the main line 81) in the third mode to be the same as the impedance on the sub-line 82 side viewed from the main line 81 side (a signal transmitted on the main line 81) in the first mode and the second mode. The first termination circuit 84 is connected to a path between an output path 88 (first output path) that connects the first end 821 or the second end 822 of the sub-line 82 and the third connection terminal 873, and the ground. That is, the first termination circuit 84 connects the output path 88 to the ground. In more detail, the first termination circuit 84 is connected to a path between a node N1 on the output path 88 and the ground. A state in which detection is not performed means during non-detection, and is a state in which the high-frequency signal transmitted on the main line 81 is not detected via the sub-line 82.

The first termination circuit 84 includes, for example, a resistor R1. The resistor R1 is connected in series with the termination switch 89. In more detail, one end of the resistor R1 is connected to a terminal 892 of the termination switch 89, and the other end of the resistor R1 is connected to the ground.

1.8 Output Path

The output path 88 (first output path) is a signal path that connects the first end 821 or the second end 822 of the sub-line 82 and the third connection terminal 873, and is a signal path that transmits a detection signal detected by the sub-line 82 from the first end 821 or the second end 822 of the sub-line 82 to the third connection terminal 873. The second selection switch 85*b* and the third selection switch 86*a* are provided on the output path 88.

The output path 88 has first to fourth paths 881 to 884. The first path 881 connects the first end 821 of the sub-line 82 and the terminal 853 of the second selection switch 85*b*. The second path 882 connects the second end 822 of the sub-line 82 and the terminal 861 of the third selection switch 86*a*. The third path 883 connects the terminal 854 of the second selection switch 85*b* and the terminal 862 of the third selection switch 86*a*. The fourth path 884 connects a node N2 of the third path 883 and the third connection terminal 873. The node N1 is provided on the fourth path 884. That is, the first termination circuit 84 and the termination switch 89 are connected in series between the node N1 of the fourth path 884 and the ground.

In the first mode, the third selection switch 86*a* is switched to a connection state, and the second selection switch 85*b* is switched to a non-connection state, so that the output path 88 connects the second end 822 of the sub-line 82 to the third connection terminal 873. In the first mode, the termination switch 89 is switched to a non-connection state, so that the first termination circuit 84 is isolated from the output path 88. In the second mode, the second selection switch 85*b* is switched to a connection state, and the third selection switch 86*a* is switched to a non-connection state, so that the output path 88 connects the first end 821 of the sub-line 82 to the third connection terminal 873. In the second mode, the termination switch 89 is switched to a non-connection state, so that the first termination circuit 84 is isolated from the output path 88. In the third mode, the third selection switch 86*a* is switched to the connection state, the second selection switch 85*b* is switched to a non-connection state, and the termination switch 89 is switched to the connection state, so that the output path 88 connects the second end 822 of the sub-line 82 to the first termination circuit 84.

1.9 Termination Switch

The termination switch 89 switches between connection and non-connection between the first termination circuit 84 and the output path 88. The termination switch 89 has two terminals 891 and 892. The terminal 891 is connected to the node N1 of the output path 88. The terminal 892 is connected to one end of the resistor R1 of the first termination circuit 84.

2 Operation

The directional coupler 8 has the first mode, the second mode, and the third mode as described above. The first mode is a detection mode of detecting a signal (forward signal) transmitted on the main line 81 from the first end 811 to the second end 812. The second mode is a detection mode of detecting a signal (backward signal) transmitted on the main line 81 from the second end 812 to the first end 811. The third mode is a non-detection mode where detection is not performed on a signal transmitted on the main line 81.

2.1 First Mode

In the directional coupler 8, in the first mode, as illustrated in FIG. 1, the terminal 851 and the terminal 852 of the first selection switch 85*a* are connected, and the terminal 861 and the terminal 862 of the third selection switch 86*a* are connected. In the directional coupler 8, in the first mode, the terminal 853 and the terminal 854 of the second selection switch 85*b* are disconnected, and the terminal 863 and the terminal 864 of the fourth selection switch 86*b* are disconnected. In the directional coupler 8, in the first mode, the terminal 891 and the terminal 892 of the termination switch 89 are disconnected. Thus, in the first mode, the first end 821 of the sub-line 82 is connected to the second termination circuit 83, the second end 822 of the sub-line 82 is connected to the third connection terminal 873 via the output path 88, and the first termination circuit 84 is isolated from the output path 88.

In the first mode, the directional coupler 8 detects a signal (forward signal) S1 transmitted on the main line 81 from the first end 811 to the second end 812 in the sub-line 82, and outputs a detection signal S2 to an external device (for example, a detector) via the third connection terminal 873. In the first mode, the first end 821 of the sub-line 82 is connected to the second termination circuit 83, and the second end 822 of the sub-line 82 is connected to the above-described external device via the third connection terminal 873. Therefore, in the first mode, the impedance on the sub-line 82 side as viewed from the main line 81 side seems to include the impedance corresponding to the second termination circuit 83 and the above-described external device.

2.2 Second Mode

Figure 2:
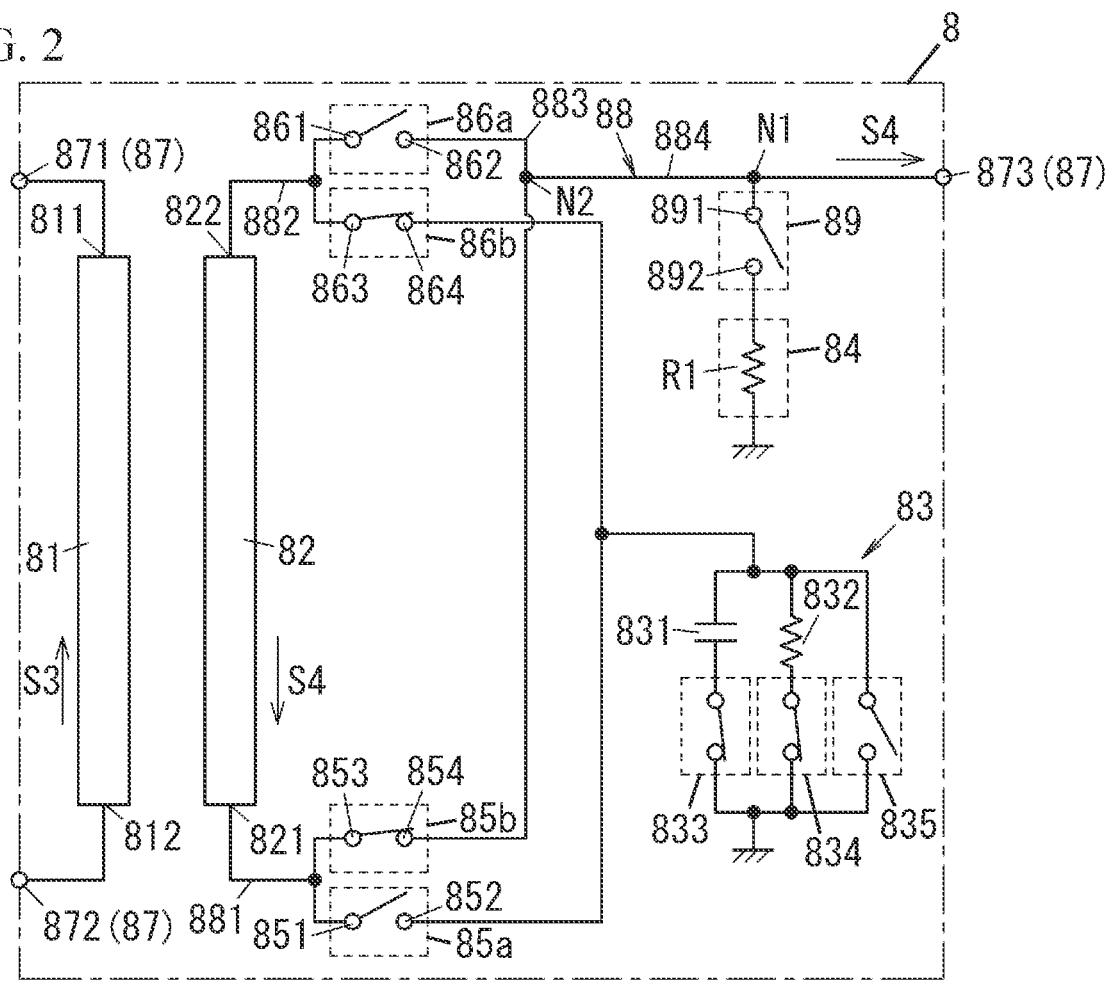
FIG. 2 is a circuit diagram illustrating a second mode of the directional coupler.

In the directional coupler 8, in the second mode, as illustrated in FIG. 2, the terminal 853 and the terminal 854 of the second selection switch 85*b* are connected, and the terminal 863 and the terminal 864 of the fourth selection switch 86*b* are connected. In the directional coupler 8, in the second mode, the terminal 851 and the terminal 852 of the first selection switch 85*a* are disconnected, and the terminal 861 and the terminal 862 of the third selection switch 86*a* are disconnected. In the directional coupler 8, in the second mode, the terminal 891 and the terminal 892 of the termination switch 89 are disconnected. Thus, in the second mode, the first end 821 of the sub-line 82 is connected to the third connection terminal 873 via the output path 88, the second end 822 of the sub-line 82 is connected to the second termination circuit 83, and the first termination circuit 84 is isolated from the output path 88.

In the second mode, the directional coupler 8 detects a signal (backward signal) S3 transmitted on the main line 81 from the second end 812 to the first end 811 in the sub-line 82, and outputs a detection signal S4 to an external device (for example, a detector) via the third connection terminal 873. In the second mode, the first end 821 of the sub-line 82 is connected to the above-described external device via the third connection terminal 873, and the second end 822 of the sub-line 82 is connected to the second termination circuit 83. Therefore, in the second mode, the impedance on the sub-line 82 side viewed from the main line 81 side seems to include the impedance corresponding to the second termination circuit 83 and the above-described external device.

2.3 Third Mode

Figure 3:
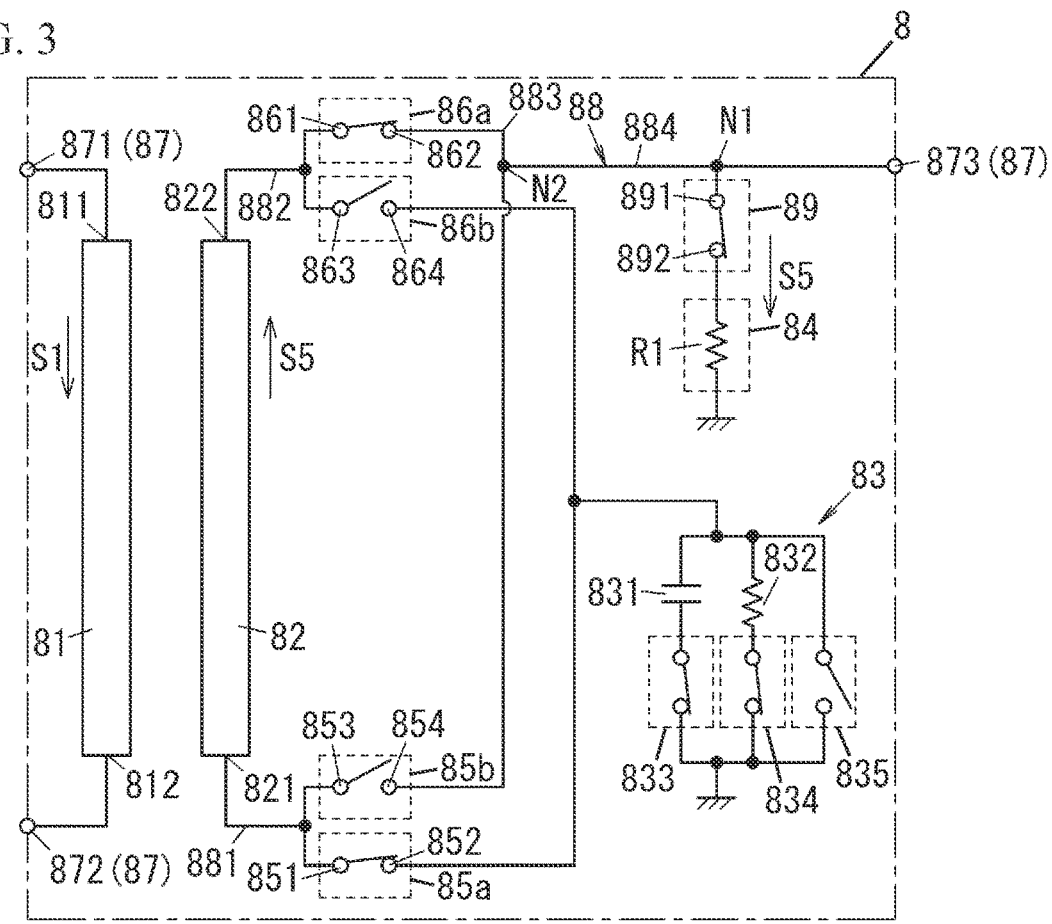
FIG. 3 is a circuit diagram illustrating a third mode of the directional coupler.

In the directional coupler 8, in the third mode, as illustrated in FIG. 3, the terminal 851 and the terminal 852 of the first selection switch 85*a* are connected, and the terminal 861 and the terminal 862 of the third selection switch 86*a* are connected. In the directional coupler 8, in the third mode, the terminal 853 and the terminal 854 of the second selection switch 85*b* are disconnected, and the terminal 863 and the terminal 864 of the fourth selection switch 86*b* are disconnected. In the directional coupler 8, in the third mode, the terminal 891 and the terminal 892 of the termination switch 89 are connected. That is, the third mode is the same as a case where the terminal 891 and the terminal 892 of the termination switch 89 are connected in the first mode. Thus, in the third mode, the first end 821 of the sub-line 82 is terminated by the second termination circuit 83, the second end 822 of the sub-line 82 is connected to the third connection terminal 873 via the output path 88, and the third connection terminal 873 is terminated by the first termination circuit 84. That is, the second end 822 of the sub-line 82 is terminated by the first termination circuit 84.

In the directional coupler 8, in the third mode, a part of the signal S1 (forward signal) transmitted on the main line 81 from the first end 811 to the second end 812 flows in the sub-line 82. A signal S5 that flows in the sub-line 82 is transmitted on the output path 88 from the second end 822 of the sub-line 82, and flows from the node N1 of the output path 88 to the ground via the termination switch 89 and the first termination circuit 84. For this reason, in the third mode, the signal S5 flowing from the main line 81 in the sub-line 82 is rarely outputted from the third connection terminal 873.

In the directional coupler 8, in the third mode, the first end 821 of the sub-line 82 is terminated by the second termination circuit 83, and the second end 822 of the sub-line 82 is terminated by the first termination circuit 84. Thus, the impedance on the sub-line 82 side viewed from the main line 81 side includes the impedance corresponding to the first termination circuit 84 and the second termination circuit 83. The impedance of the first termination circuit 84 has, for example, magnitude similar to the impedance of the above-described external device (for example, a detector) connected to the third connection terminal 873. Therefore, it is possible to reduce the change in the impedance on the sub-line 82 side as viewed from the main line 81 side between the first mode and the second mode (during detection), and the third mode (during non-detection). As a result, it is possible to reduce the change in the insertion loss of the main line 81 and the change in the phase of a signal transmitted on the main line 81 between a case where detection is performed (during detection) and a case where detection is not performed (during non-detection).

In the above description, in the third mode, the terminal 891 and the terminal 892 of the termination switch 89 in the first mode are connected. Note that, in the third mode, the terminal 891 and the terminal 892 of the termination switch 89 in the second mode may be connected.

3 Comparison with Comparative Example 1

The insertion loss and phase characteristics of the directional coupler 8 of Embodiment 1 will be described by comparison with a directional coupler of Comparative Example 1.

The directional coupler of Comparative Example 1 has a configuration in which the first termination circuit 84 and the termination switch 89 in the directional coupler 8 of Embodiment 1 are eliminated. In the directional coupler of Comparative Example 1, in detecting a forward signal, the first to fourth selection switches 85*a*, 85*b*, 86*a*, and 86*b* are switched in the same manner as the first mode of the directional coupler 8 of Embodiment 1. In the directional coupler of Comparative Example 1, in detecting a backward signal, the first to fourth selection switches 85*a*, 85*b*, 86*a*, and 86*b* are switched in the same manner as the second mode of the directional coupler 8 of Embodiment 1. In the directional coupler of Comparative Example 1, in a case where detection is not performed, the first to fourth selection switches 85*a*, 85*b*, 86*a*, and 86*b* are switched to the non-connection state.

Figure 4:
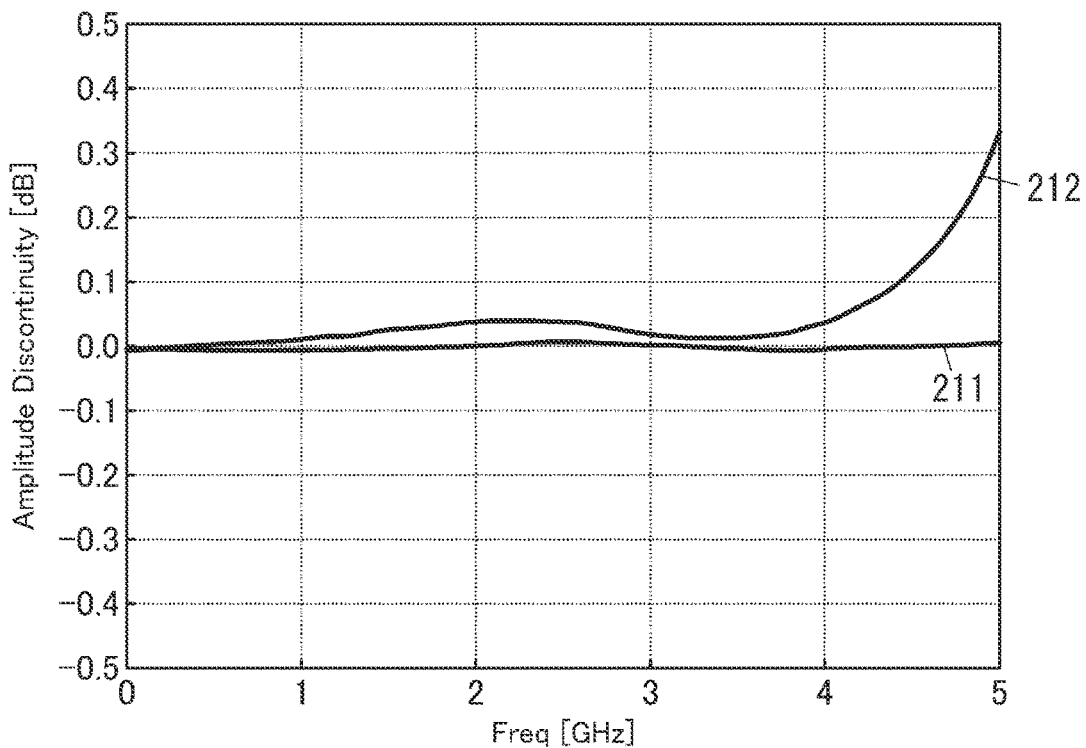
FIG. 4 is a graph illustrating the amplitude discontinuity of the directional coupler and a directional coupler of Comparative Example 1.

FIG. 4 is a graph illustrating a difference in the insertion loss of the main line 81 between a case where detection is performed and a case where detection is not performed, in the directional coupler 8 and the directional coupler of Comparative Example 1. The difference is described as amplitude discontinuity. In FIG. 4, the horizontal axis represents a frequency of a high-frequency signal transmitted on the main line 81. In more detail, data 211 of FIG. 4 indicates a difference (amplitude discontinuity) between the insertion loss of the main line 81 in the first mode and the insertion loss of the main line 81 in the third mode, in Embodiment 1. On the other hand, data 212 of FIG. 4 indicates a difference (amplitude discontinuity) between the insertion loss of the main line 81 in a case where detection is performed and the insertion loss of the main line 81 in a case where detection is not performed, in the directional coupler of Comparative Example 1.

As illustrated in FIG. 4, the amplitude discontinuity (data 211) in the directional coupler 8 of Embodiment 1 is smaller than the amplitude discontinuity (data 212) in the directional coupler of Comparative Example 1. In particular, while the amplitude discontinuity in the directional coupler of Comparative Example 1 rapidly increases on a high frequency side, the amplitude discontinuity in the directional coupler 8 of Embodiment 1 is small in absolute value on the high frequency side. From the above, it is understood from FIG. 4 that it is possible to suppress the fluctuation of the insertion loss of the main line 81 depending on a usage state (mode) of the sub-line 82, in the directional coupler 8 of Embodiment 1.

Figure 5:
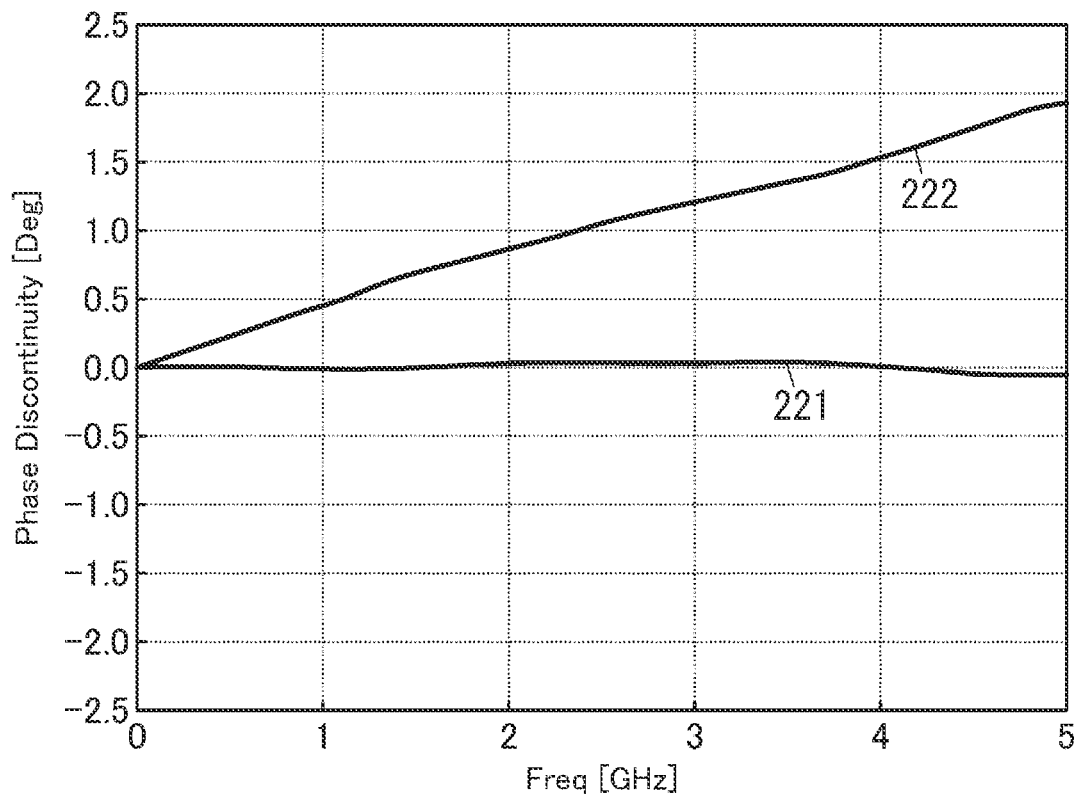
FIG. 5 is a graph illustrating the phase discontinuity of the directional coupler and the directional coupler of Comparative Example 1.

FIG. 5 is a graph illustrating the change in the phase of the high-frequency signal transmitted on the main line 81 between a case where detection is performed and a case where detection is not performed, in the directional coupler 8 and the directional coupler of Comparative Example 1. The change in the phase is described as phase discontinuity. In FIG. 5, the horizontal axis represents a frequency of the high-frequency signal transmitted on the main line 81. In more detail, data 221 of FIG. 5 indicates a difference (phase discontinuity) between a phase of the high-frequency signal transmitted on the main line 81 in the first mode and a phase of the high-frequency signal transmitted on the main line 81 in the third mode, in Embodiment 1. On the other hand, data 222 of FIG. 5 indicates a difference (phase discontinuity) between a phase of the high-frequency signal transmitted on the main line 81 in a case where detection is performed and a phase of the high-frequency signal transmitted on the main line 81 in a case where detection is not performed, in the directional coupler of Comparative Example 1.

As illustrated in FIG. 5, the phase discontinuity (data 221) in the directional coupler 8 of Embodiment 1 is smaller than the phase discontinuity (data 222) in the directional coupler of Comparative Example 1. In particular, while the phase discontinuity in the directional coupler of Comparative Example 1 increases monotonously as the frequency becomes higher, the phase discontinuity in the directional coupler 8 of Embodiment 1 is substantially constant even though the frequency becomes higher. From the above, it is understood from FIG. 5 that it is possible to suppress the fluctuation of the phase of the high-frequency signal transmitted on the main line 81 depending on the presence or absence of detection, in the directional coupler 8 of Embodiment 1.

4 Comparison with Comparative Example 2

The superiority of a connection position of the first termination circuit 84 in the directional coupler 8 of Embodiment 1 will be described by comparison with a directional coupler of Comparative Example 2.

The directional coupler of Comparative Example 2 includes a first resistor, a second resistor, a first switch, and a second switch, instead of the first termination circuit 84 and the termination switch 89 in the directional coupler 8 of Embodiment 1. The first resistor and the second resistor function as pseudo termination resistors. The first resistor is connected between the first end 821 of the sub-line 82 and the ground. The second resistor is connected between the second end 822 of the sub-line 82 and the ground. The first switch switches between connection and non-connection between the first end 821 of the sub-line 82 and the first resistor. The second termination switch switches between connection and non-connection between the second end 822 of the sub-line 82 and the second resistor.

In the directional coupler of Comparative Example 2, in a case where detection is performed, the first switch and the second switch are switched to a non-connection state to isolate the first resistor and the second resistor from the sub-line 82. An external device (for example, a detector) is connected to one end of the first end 821 and the second end 822 of the sub-line 82 via the third connection terminal 873, and the second termination circuit 83 is connected to the other end of the first end 821 and the second end 822 of the sub-line 82. In the directional coupler of Comparative Example 2, in a case where detection is not performed, in a state in which the third connection terminal 873 and the second termination circuit 83 are isolated from the sub-line 82, the first switch and the second switch are switched to a connection state to connect the first resistor and the second resistor to the sub-line 82. Thus, in the directional coupler of Comparative Example 2, in a case where detection is performed, the second termination circuit 83 and the above-described external device are connected to the sub-line 82, and in a case where detection is not performed, the first resistor and the second resistor are connected to the sub-line 82. As a result, as with a case of the directional coupler 8 according to Embodiment 1, it is possible to suppress the fluctuation of the insertion loss of the main line 81 and the phase of the high-frequency signal transmitted on the main line 81 depending on the presence or absence of detection.

In the directional coupler of Comparative Example 2, two resistors (first resistor and second resistor) and two switches (first switch and second switch) are provided with respect to one sub-line. Therefore, in the directional coupler of Comparative Example 2, in a case where a plurality of sub-lines are included, the greater the number of sub-lines, the greater the number of resistors and the number of switches to be provided. For this reason, a circuit area of the directional coupler of Comparative Example 2 comparatively increases.

In the directional coupler 8 of Embodiment 1, the first termination circuit 84 is connected to the node N1 of the output path 88 that connects the first end 821 or the second end 822 of the sub-line 82 and the third connection terminal 873. That is, the first termination circuit 84 is not provided for each sub-line 82 unlike Comparative Example 2. Therefore, in the directional coupler 8 of Embodiment 1, even in a case where a plurality of sub-lines are included, because the number of first termination circuits 84 is one, it is possible to suppress an increase in the circuit area of the directional coupler 8, compared to the directional coupler of Comparative Example 2.

5 Effects

The directional coupler 8 according to Embodiment 1 includes the main line 81, the sub-line 82, the third connection terminal (output terminal) 873, the first termination circuit 84 (termination circuit), and the termination switch 89. The third connection terminal 873 is a connection terminal for outputting the detection signal S2 detected by the sub-line 82. The termination circuit 84 is connected to a path between the output path 88 that connects the sub-line 82 and the third connection terminal 873, and the ground. The termination switch 89 switches between connection and non-connection between the output path 88 and the termination circuit 84.

According to this configuration, during non-connection, the output path 88 and the first termination circuit 84 are connected by the termination switch 89, so that the sub-line 82 can be terminated by the first termination circuit 84. Thus, it is possible to reduce the change in the impedance of the sub-line 82 to the signal transmitted on the main line 81 between during detection and during non-detection. Therefore, it is possible to reduce the change in the insertion loss of the main line 81 and the change in the phase of the signal transmitted on the main line 81 between during detection and during non-detection.

That is, according to the configuration of Embodiment 1, it is possible to reduce the difference in the insertion loss of the main line 81 and the phase difference of the high-frequency signal transmitted on the main line 81 between during detection (first mode and second mode) and during non-detection (third mode). Therefore, it is possible to suppress the change in the insertion loss of the main line 81 and the change in the phase of the high-frequency signal transmitted on the main line 81 depending on the presence or absence of detection. Furthermore, it is possible to reduce a difference between the amplitude of a signal transmitted on the main line 81 obtained by detection during detection (first mode and second mode) and the amplitude of a signal transmitted on the main line 81 during non-detection (third mode), and to improve the accuracy of detection.

6 Modification Examples

The directional coupler 8 according to Embodiment 1 may include any of first termination circuits 84*a* to 84*d*, instead of the first termination circuit 84, as illustrated in FIGS. 6 to 9.

Figure 6:
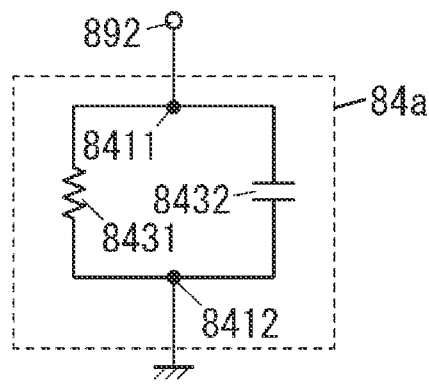
FIG. 6 is a circuit diagram illustrating a modification example of a first termination circuit used in the directional coupler.

As illustrated in FIG. 6, the first termination circuit 84*a* has a first end 8411 and a second end 8412. The first end 8411 is connected to the terminal 892 of the termination switch 89, and the second end 8412 is connected to the ground. The first termination circuit 84*a* has, for example, a resistor 8431 and a capacitor 8432. The resistor 8431 and the capacitor 8432 are connected in parallel. In more detail, each of the resistor 8431 and the capacitor 8432 has one end connected to the first end 8411 of the first termination circuit 84*a* and the other end connected to the second end 8412 of the first termination circuit 84*a*.

Figure 7:
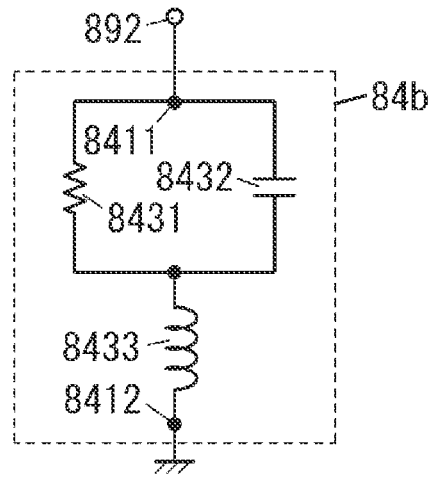
FIG. 7 is a circuit diagram illustrating another modification example of a first termination circuit used in the directional coupler.

As illustrated in FIG. 7, the first termination circuit 84*b* has a first end 8411 and a second end 8412. The first end 8411 is connected to the terminal 892 of the termination switch 89, and the second end 8412 is connected to the ground. The first termination circuit 84*b* has, for example, a resistor 8431, a capacitor 8432, and an inductor 8433. The resistor 8431 and the capacitor 8432 are connected in parallel with each other. The inductor 8433 is connected in series with the resistor 8431 and the capacitor 8432. In more detail, each of the resistor 8431 and the capacitor 8432 has one end connected to the first end 8411 of the first termination circuit 84*b* and the other end connected to one end of the inductor 8433. The inductor 8433 has one end connected to the other end of each of the resistor 8431 and the capacitor 8432 and the other end connected to the second end 8412 of the first termination circuit 84*b*.

Figure 8:
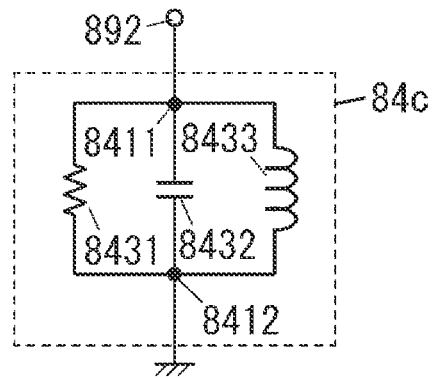
FIG. 8 is a circuit diagram illustrating still another modification example of a first termination circuit used in the directional coupler.

As illustrated in FIG. 8, the first termination circuit 84*c* has a first end 8411 and a second end 8412. The first end 8411 is connected to the terminal 892 of the termination switch 89, and the second end 8412 is connected to the ground. The first termination circuit 84*c* has, for example, a resistor 8431, a capacitor 8432, and an inductor 8433. The resistor 8431, the capacitor 8432, and the inductor 8433 are connected in parallel with one another. In more detail, each of the resistor 8431, the capacitor 8432, and the inductor 8433 has one end connected to the first end 8411 of the first termination circuit 84*c* and the other end connected to the second end 8412 of the first termination circuit 84*c*.

Figure 9:
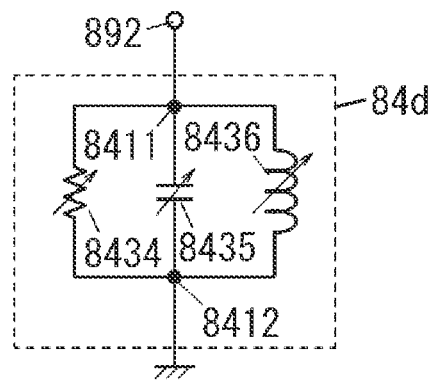
FIG. 9 is a circuit diagram illustrating still another modification example of a first termination circuit used in the directional coupler.

As illustrated in FIG. 9, the first termination circuit 84*d* has a first end 8411 and a second end 8412. The first end 8411 is connected to the terminal 892 of the termination switch 89, and the second end 8412 is connected to the ground. The first termination circuit 84*d* has, for example, a variable resistor 8434, a variable capacitor 8435, and a variable inductor 8436. The variable resistor 8434, the variable capacitor 8435, and the variable inductor 8436 are connected in parallel with one another. In more detail, each of the variable resistor 8434, the variable capacitor 8435, and the variable inductor 8436 has one end connected to the first end 8411 of the first termination circuit 84*d* and the other end connected to the second end 8412 of the first termination circuit 84*d*. Variable elements (variable resistor 8434, variable capacitor 8435, or variable inductor 8436) are used as constituent elements of the first termination circuit 84*d*, so that it is possible to adjust the impedance of the first termination circuit 84*d*, for example, after the manufacture of the directional coupler 8. Therefore, for example, it is possible to optimize the impedance of the first termination circuit 84*d* with respect to a frequency band of a signal transmitted on the main line 81, and to minimize the difference in the insertion loss of the main line 81 and the phase difference of the high-frequency signal between the first mode and the second mode (during detection), and the third mode (during non-detection).

Even in such cases, as with the first termination circuit 84, it is possible to adjust the impedance on the sub-line 82 side viewed from the main line 81 side (the high-frequency signal transmitted on the main line 81) in the third mode.

The first termination circuit 84 is not limited to the above-described configuration, and may be configured with any one or two of the variable resistor 8434, the variable capacitor 8435, and the variable inductor 8436. The first termination circuit 84 may have, for example, one or more variable elements (variable resistor 8434, variable capacitor 8435, or variable inductor 8436) and one or more non-variable elements (resistor 8431, capacitor 8432, or inductor 8433). Even in this case, it is possible to adjust the impedance of the first termination circuit 84, for example, after the manufacture of the directional coupler 8.

Embodiment 2

A directional coupler 8*b* according to Embodiment 2 will be described with reference to FIG. 10. In regard to the directional coupler 8*b* according to Embodiment 2, the same constituent elements as those of the directional coupler 8 according to Embodiment 1 are represented by the same reference numerals, and the description thereof will not be repeated.

The directional coupler 8*b* according to Embodiment 2 is different from the directional coupler 8 according to Embodiment 1 in that a first sub-line 82*a* and a second sub-line 82*b* are included, and in that an isolation switch 97, a fifth selection switch 85*c*, and a sixth selection switch 85*d* are included.

1 Configuration

Figure 10:
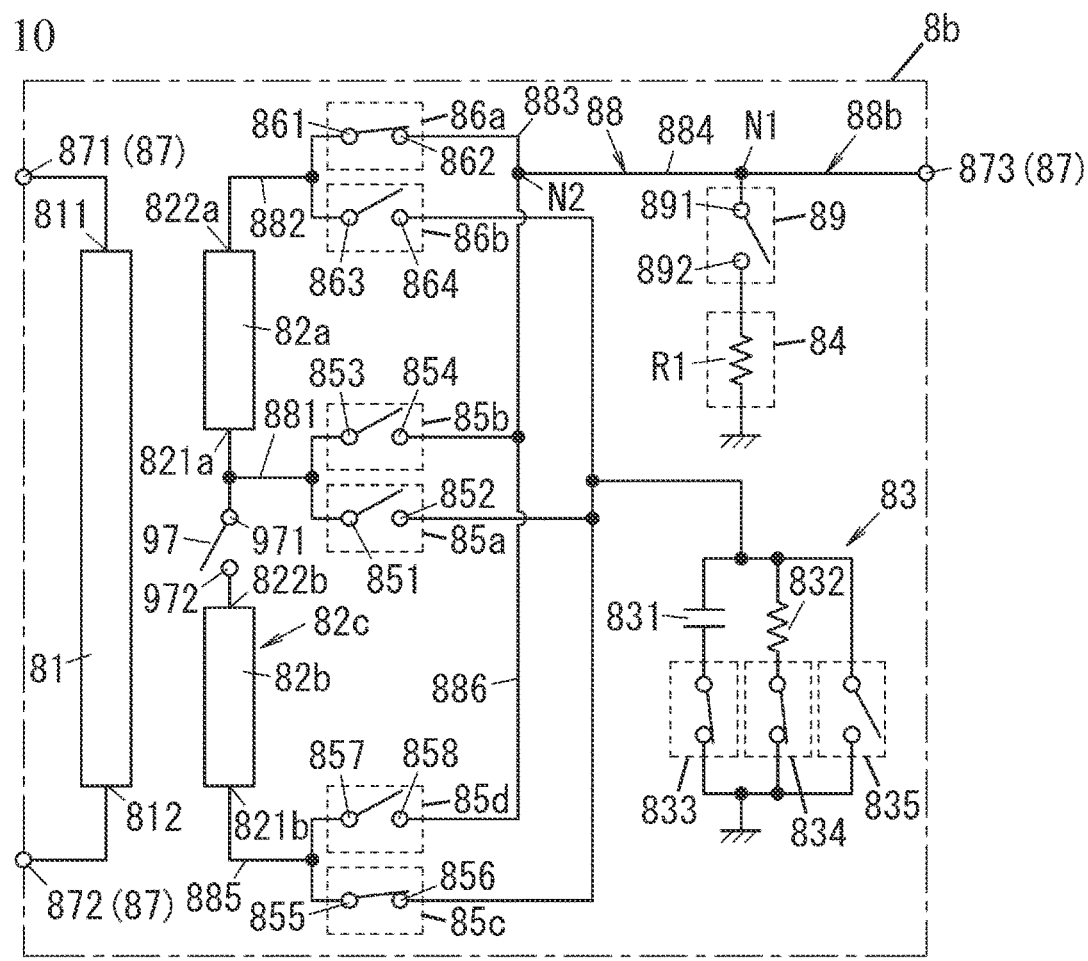
FIG. 10 is a circuit diagram illustrating a directional coupler according to Embodiment 2.

As illustrated in FIG. 10, the directional coupler 8*b* according to Embodiment 2 includes the main line 81, the first sub-line 82*a*, the second sub-line 82*b*, a plurality (in the example illustrated in the drawing, three) of connection terminals 87, the isolation switch 97, the first selection switch 85*a*, the second selection switch 85*b*, the third selection switch 86*a*, the fourth selection switch 86*b*, the second termination circuit 83, the first termination circuit 84, the fifth selection switch 85*c*, and the sixth selection switch 85*d*.

The directional coupler 8*b* according to Embodiment 2 has, as a detection mode, a fourth mode and a fifth mode, in addition to a first mode and a second mode. The first mode is a detection mode where a signal in a first frequency band among signals (forward signals) transmitted on the main line 81 from the first end 811 to the second end 812 is detected in the first sub-line 82*a*. The second mode is a detection mode where the signal in the first frequency band in signals (backward signals) transmitted on the main line 81 from the second end 812 to the first end 811 is detected in the first sub-line 82*a*. The fourth mode is a detection mode where a signal in a second frequency band among the signals (forward signals) transmitted on the main line 81 from the first end 811 to the second end 812 is detected in the first sub-line 82*a* and the second sub-line 82*b*. The fifth mode is a detection mode where the signal in the second frequency band among the signals (backward signals) transmitted on the main line 81 from the second end 812 to the first end 811 is detected in the first sub-line 82*a* and the second sub-line 82*b*. The second frequency band is a band of a frequency lower than the first frequency band. That is, the first mode and the second mode are a high band (HB) mode where a signal having a relatively high frequency is detected, and the fourth mode and the fifth mode are a low band (LB) mode where a signal having a relatively low frequency is detected.

The directional coupler 8*b* according to Embodiment 2 has a third mode and a sixth mode as a non-detection mode. The third mode is a mode where detection is not performed and the signal in the first frequency band is transmitted, received, or transmitted and received using the main line 81. The sixth mode is a mode where detection is not performed and the signal in the second frequency band is transmitted, received, or transmitted and received using the main line 81.

1.1 Sub-Line

The first sub-line 82*a* has a first end 821*a* and a second end 822*a* that are both ends of the first sub-line 82*a* in a longitudinal direction. The first end 821*a* of the first sub-line 82*a* is connected to the first selection switch 85*a* and the second selection switch 85*b*. Furthermore, the first end 821*a* of the first sub-line 82*a* is connected to the second end 822*b* of the second sub-line 82*b* via the isolation switch 97. The second end 822*a* of the first sub-line 82*a* is connected to the third selection switch 86*a* and the fourth selection switch 86*b*. The first sub-line 82*a* is coupled to the main line 81 in terms of an electromagnetic field, for example. The first sub-line 82*a* corresponds to the sub-line 82 of Embodiment 1.

The second sub-line 82*b* has a first end 821*b* and a second end 822*b* that are both ends of the second sub-line 82*b* in the longitudinal direction. The first end 821*b* of the second sub-line 82*b* is connected to the fifth selection switch 85*c* and the sixth selection switch 85*d*. In more detail, the first end 821*b* of the second sub-line 82*b* is connected to a terminal 855 of the fifth selection switch 85*c* and a terminal 857 of the sixth selection switch 85*d*. The second end 822*b* of the second sub-line 82*b* is connected to the first end 821*a* of the first sub-line 82*a* via the isolation switch 97. The second sub-line 82*b* is coupled to the main line 81 in terms of an electromagnetic field, for example.

1.2 Isolation Switch 97, Fifth Selection Switch, and Sixth Selection Switch

The isolation switch 97 is a switch for, during detection and during non-detection when only the first sub-line 82*a* between the first sub-line 82*a* and the second sub-line 82*b* is used, isolating the unused second sub-line 82*b* from the first sub-line 82*a*. The isolation switch 97 has two terminals 971 and 972. The terminal 971 is connected to the first end 821*a* of the first sub-line 82*a*, and is connected to a terminal 851 of the first selection switch 85*a* and a terminal 853 of the second selection switch 85*b*. The terminal 972 is connected to the second end 822*b* of the second sub-line 82*b*.

The isolation switch 97 is switched to non-connection in a mode (first to third modes) where only the first sub-line 82*a* between the first sub-line 82*a* and the second sub-line 82*b* is used. The isolation switch 97 is switched to connection in a mode (fourth to sixth modes) where the first sub-line 82*a* and the second sub-line 82*b* are used.

The fifth selection switch 85*c* and the sixth selection switch 85*d* are switches for switching a connection destination of the first end 821*b* of the second sub-line 82*b* to the third connection terminal 873 or the second termination circuit 83. The fifth selection switch 85*c* has two terminals 855 and 856. The terminal 855 is connected to the first end 821b of the second sub-line 82b. The terminal 856 is connected to the second termination circuit 83. The sixth selection switch 85d has two terminals 857 and 858. The terminal 857 is connected to the first end 821b of the second sub-line 82b. The terminal 858 is connected to the third connection terminal 873.

In each of the fifth selection switch 85c and the sixth selection switch 85d, in the fourth to sixth modes, in a case where the second end 822a of the first sub-line 82a is connected to one of the third connection terminal 873 and the second termination circuit 83, connection and non-connection are switched in such a manner to connect the first end 821b of the second sub-line 82b to the other of the third connection terminal 873 and the second termination circuit 83.

In more detail, the fifth selection switch 85c switches between a first state of connecting the terminal 855 and the terminal 856 and a second state of connecting the terminal 855 and the terminal 856. The fifth selection switch 85c connects the terminal 855 and the terminal 856 in the fourth mode and the sixth mode, and disconnects the terminal 855 and the terminal 856 in other modes, that is, the first mode, the second mode, the third mode, the fifth mode, and the sixth mode.

The sixth selection switch 85d switches between a first state of connecting the terminal 857 and the terminal 858 and a second state of connecting the terminal 857 and the terminal 858. The sixth selection switch 85d connects the terminal 857 and the terminal 858 in the fifth mode, and disconnects the terminal 857 and the terminal 858 in other modes, that is, the first mode, the second mode, the third mode, the fourth mode, and the sixth mode.

Thus, in the fourth mode and the sixth mode, the first end 821b of the second sub-line 82b is connected to the second termination circuit 83. In the fifth mode, the first end 821b of the second sub-line 82b is connected to the third connection terminal 873. In the first mode, the second mode, and the third mode, the first end 821b of the second sub-line 82b is connected to neither the second termination circuit 83 nor the third connection terminal 873.

1.3 Output Path

In Embodiment 2, an output path 88b that is a second output path different from the output path 88 as a first output path is further included. The output path 88b is a signal path between a first end (the first end 821b of the second sub-line 82b) or a second end (the second end 822a of the first sub-line 82a of a series circuit of the first sub-line 82a and the second sub-line 82b, and the third connection terminal 873, and is a signal path that transmits a detection signal detected by the above-described series circuit from the above-described series circuit to the third connection terminal 873. A third selection switch 86a and a sixth selection switch 85d are provided on the output path 88b. The output path 88b has a second path 882, a fourth path 884, a fifth path 885, and a sixth path 886.

The second path 882 is the same as the second path 882 of Embodiment 1 and is a path that connects the second end 822a of the first sub-line 82a and the terminal 861 of the third selection switch 86a. The fourth path 884 is a path that connects a node N2 of the sixth path 886 and the third connection terminal 873. A node N1 is provided on the fourth path 884. That is, the first termination circuit 84 and the termination switch 89 are connected in series between the node N1 of the fourth path 884 and the ground. The fifth path 885 is a path that connects the first end 821b of the second sub-line 82b and the terminal 857 of the sixth selection switch 85d. The sixth path 886 is a path that connects the terminal 862 of the third selection switch 86a and the terminal 858 of the sixth selection switch 85d.

The second output path 88b is partially common to the first output path 88. In more detail, the second path 882, a part of the sixth path 886, and the fourth path 884 are common between the first output path 88 and the second output path 88b. The node N1 is provided in a common portion (fourth path 884) between the first output path 88 and the second output path 88b.

In the fourth mode, the third selection switch 86a is switched to the connection state, and the sixth selection switch 85d is switched to the non-connection state, so that the output path 88b connects the second end 822a of the first sub-line 82a to the third connection terminal 873. In the fourth mode, the termination switch 89 is switched to the non-connection state, so that the termination circuit 84 is isolated from the output path 88. Thus, a signal detected by the series circuit of the first sub-line 82a and the second sub-line 82b is transmitted from the second end 822a of the first sub-line 82a to the third connection terminal 873.

In the fifth mode, the sixth selection switch 85d is switched to the connection state, and the third selection switch 86a is switched to the non-connection state, so that the output path 88b connects the first end 821b of the second sub-line 82b to the third connection terminal 873. In the fifth mode, the termination switch 89 is switched to the non-connection state, so that the termination circuit 84 is isolated from the output path 88. Thus, a signal detected by the above-described series circuit is transmitted from the first end 821b of the second sub-line 82b to the third connection terminal 873.

In the sixth mode, the third selection switch 86a is switched to the connection state, the sixth selection switch 85d is switched to the non-connection state, and the termination switch 89 is switched to the connection state, so that the output path 88 connects the second end 822a of the first sub-line 82a to the termination circuit 84. Thus, the signal that flows from the main line 81 to the above-described series circuit flows to the ground via the termination switch 89 and the termination circuit 84.

In the output path 88b, in the first mode, the second mode, and the third mode, the fifth selection switch 85c and the sixth selection switch 85d are switched to the non-connection state.

2 Operation

As described above, the directional coupler 8b has the first mode, the second mode, the third mode, the fourth mode, the fifth mode, and the sixth mode.

2.1 First Mode

In the directional coupler 8b, in the first mode, the isolation switch 97 is disconnected. In the directional coupler 8b, in the first mode, the terminal 851 and the terminal 852 of the first selection switch 85a are connected, and the terminal 861 and the terminal 862 of the third selection switch 86a are connected. In the directional coupler 8b, in the first mode, the terminal 853 and the terminal 854 of the second selection switch 85b are disconnected, and the terminal 863 and the terminal 864 of the fourth selection switch 86b are disconnected. In the directional coupler 8b, in the first mode, the terminal 855 and the terminal 856 of the fifth selection switch 85c are disconnected, and the terminal 857 and the terminal 858 of the sixth selection switch 85d are disconnected. In the directional coupler 8b, in the first mode, the terminal 891 and the terminal 892 of the termination switch 89 are disconnected. Thus, in the first mode, the first end 821*a* of the first sub-line 82*a* is terminated by the second termination circuit 83, and the second end 822*a* of the first sub-line 82*a* is connected to the third connection terminal 873. In the first mode, the first end 821*b* and the second end 822*b* of the second sub-line 82*b* are disconnected. In the first mode, the termination circuit 84 is isolated from the output path 88.

In the first mode, the directional coupler 8*b* detects the signal in the first frequency band among the signals (forward signals) transmitted on the main line 81 from the first end 811 to the second end 812 in the first sub-line 82*a*, and outputs the detection signal from the second end 822*a* of the first sub-line 82*a* to an external device (for example, a detector) via the third connection terminal 873.

2.2 Second Mode

In the directional coupler 8*b*, in the second mode, the isolation switch 97 is disconnected. In the directional coupler 8*b*, in the second mode, the terminal 853 and the terminal 854 of the second selection switch 85*b* are connected, and the terminal 863 and the terminal 864 of the fourth selection switch 86*b* are connected. In the directional coupler 8*b*, in the second mode, the terminal 851 and the terminal 852 of the first selection switch 85*a* are disconnected, and the terminal 861 and the terminal 862 of the third selection switch 86*a* are disconnected. In the directional coupler 8*b*, in the second mode, the terminal 855 and the terminal 856 of the fifth selection switch 85*c* are disconnected, and the terminal 857 and the terminal 858 of the sixth selection switch 85*d* are disconnected. In the directional coupler 8*b*, in the second mode, the terminal 891 and the terminal 892 of the termination switch 89 are disconnected. Thus, in the second mode, the first end 821*a* of the first sub-line 82*a* is connected to the third connection terminal 873, and the second end 822*a* of the first sub-line 82*a* is terminated by the second termination circuit 83. In the second mode, the first end 821*b* and the second end 822*b* of the second sub-line 82*b* are disconnected. In the second mode, the termination circuit 84 is isolated from the output path 88.

In the second mode, the directional coupler 8*b* detects the signal in the first frequency band among the signals (backward signals) transmitted on the main line 81 from the second end 812 to the first end 811 in the first sub-line 82*a*, and outputs the detection signal from the first end 821*a* of the first sub-line 82*a* to the external device (for example, a detector) via the third connection terminal 873.

2.3 Third Mode

In the directional coupler 8*b*, in the third mode, the isolation switch 97 is disconnected. In the directional coupler 8*b*, in the third mode, the terminal 851 and the terminal 852 of the first selection switch 85*a* are connected, and the terminal 861 and the terminal 862 of the third selection switch 86*a* are connected. In the directional coupler 8*b*, in the third mode, the terminal 853 and the terminal 854 of the second selection switch 85*b* are disconnected, and the terminal 863 and the terminal 864 of the fourth selection switch 86*b* are disconnected. In the directional coupler 8*b*, in the third mode, the terminal 855 and the terminal 856 of the fifth selection switch 85*c* are disconnected, and the terminal 857 and the terminal 858 of the sixth selection switch 85*d* are disconnected. In the directional coupler 8*b*, in the third mode, the terminal 891 and the terminal 892 of the termination switch 89 are connected. That is, the third mode is the same as a case where the terminal 891 and the terminal 892 of the termination switch 89 are connected in the first mode. Thus, in the third mode, the first end 821*a* of the first sub-line 82*a* is terminated by the second termination circuit 83, the second end 822*a* of the first sub-line 82*a* is connected to the third connection terminal 873, and the third connection terminal 873 is terminated by the first termination circuit 84. In the third mode, the first end 821*b* and the second end 822*b* of the second sub-line 82*b* are disconnected.

In the directional coupler 8*b*, in the third mode, a part of the signal in the second frequency band among the signals (forward signals) transmitted on the main line 81 from the first end 811 to the second end 812 flows in the sub-line 82*c*. A signal that flows in the sub-line 82*c* flows from the node N1 of the output path 88 to the ground via the termination switch 89 and the first termination circuit 84. For this reason, in the third mode, a signal that flows from the main line 81 to the sub-line 82*c* is rarely outputted from the third connection terminal 873 to the external device (for example, a detector).

In the directional coupler 8*b*, in the third mode, the first end 821*a* of the first sub-line 82*a* is terminated by the second termination circuit 83, and the second end 822*a* of the first sub-line 82*a* is terminated by the first termination circuit 84. Thus, the impedance on the first sub-line 82*a* side viewed from the main line 81 side (the signal in the first frequency band transmitted on the main line 81) includes the impedance corresponding to the first termination circuit 84 and the second termination circuit 83. The impedance of the first termination circuit 84 has, for example, magnitude similar to the impedance of the above-described external device (for example, a detector) connected to the third connection terminal 873. Therefore, it is possible to reduce the change in the impedance on the first sub-line 82*a* side viewed from the main line 81 side (the signal in the first frequency band transmitted on the main line 81) between the first mode and the second mode (during detection), and the third mode (during non-detection). As a result, it is possible to reduce the change in the insertion loss of the main line 81 and the change in the phase of the signal transmitted on the main line 81 between a case where detection is performed (during detection) and a case where detection is not performed (during non-detection).

2.4 Fourth Mode

In the directional coupler 8*b*, in the fourth mode, the isolation switch 97 is connected. In the directional coupler 8*b*, in the fourth mode, the terminal 861 and the terminal 862 of the third selection switch 86*a* are connected, and the terminal 855 and the terminal 856 of the fifth selection switch 85*c* are connected. In the directional coupler 8*b*, in the fourth mode, the terminal 863 and the terminal 864 of the fourth selection switch 86*b* are disconnected, and the terminal 857 and the terminal 858 of the sixth selection switch 85*d* are disconnected. In the directional coupler 8*b*, in the fourth mode, the terminal 851 and the terminal 852 of the first selection switch 85*a* are disconnected, and the terminal 853 and the terminal 854 of the second selection switch 85*b* are disconnected. In the directional coupler 8*b*, in the fourth mode, the terminal 891 and the terminal 892 of the termination switch 89 are disconnected. Thus, in the fourth mode, the first sub-line 82*a* and the second sub-line 82*b* are connected in series, the first end 821*b* of the second sub-line 82*b* is terminated by the second termination circuit 83, and the second end 822*a* of the first sub-line 82*a* is connected to the third connection terminal 873. In the fourth mode, the first termination circuit 84 is isolated from the output path 88.

In the fourth mode, the first end 821*a* of the first sub-line 82*a* and the second end 822*b* of the second sub-line 82*b* are connected. Therefore, a series circuit (hereinafter, referred to as a "sub-line 82c") of the first sub-line 82a and the second sub-line 82b functions as a sub-line.

In the fourth mode, the directional coupler 8b detects the signal in the second frequency band among the signals (forward signals) transmitted on the main line 81 from the first end 811 to the second end 812 in the sub-line 82c, and outputs the detection signal from the second end 822a of the first sub-line 82a to the external device (for example, a detector) via the third connection terminal 873.

2.5 Fifth Mode

In the directional coupler 8b, in the fifth mode, the isolation switch 97 is connected. In the directional coupler 8b, in the fifth mode, the terminal 863 and the terminal 864 of the fourth selection switch 86b are connected, and the terminal 857 and the terminal 858 of the sixth selection switch 85d are connected. In the directional coupler 8b, in the fifth mode, the terminal 861 and the terminal 862 of the third selection switch 86a are disconnected, and the terminal 855 and the terminal 856 of the fifth selection switch 85c are disconnected. In the directional coupler 8b, in the fifth mode, the terminal 851 and the terminal 852 of the first selection switch 85a are disconnected, and the terminal 853 and the terminal 854 of the second selection switch 85b are disconnected. In the directional coupler 8b, in the fifth mode, the terminal 891 and the terminal 892 of the termination switch 89 are disconnected. Thus, in the fifth mode, the first sub-line 82a and the second sub-line 82b are connected in series, the first end 821b of the second sub-line 82b is connected to the third connection terminal 873, and the second end 822a of the first sub-line 82a is terminated by the second termination circuit 83. In the fifth mode, the termination circuit 84 is isolated from the output path 88.

In the fifth mode, the first end 821a of the first sub-line 82a and the second end 822b of the second sub-line 82b are connected. Therefore, the sub-line 82c functions as a sub-line.

In the fifth mode, the directional coupler 8b detects the signal in the second frequency band among the signals (backward signals) transmitted on the main line 81 from the second end 812 to the first end 811 in the sub-line 82c, and outputs the detection signal from the first end 821b of the second sub-line 82b to the external device (for example, a detector) via the third connection terminal 873.

2.6 Sixth Mode

In the directional coupler 8b, in the sixth mode, the isolation switch 97 is connected. In the directional coupler 8b, in the sixth mode, the terminal 861 and the terminal 862 of the third selection switch 86a are connected, and the terminal 855 and the terminal 856 of the fifth selection switch 85c are connected. In the directional coupler 8b, in the sixth mode, the terminal 863 and the terminal 864 of the fourth selection switch 86b are disconnected, and the terminal 857 and the terminal 858 of the sixth selection switch 85d are disconnected. In the directional coupler 8b, in the sixth mode, the terminal 851 and the terminal 852 of the first selection switch 85a are disconnected, and the terminal 853 and the terminal 854 of the second selection switch 85b are disconnected. In the directional coupler 8b, in the sixth mode, the terminal 891 and the terminal 892 of the termination switch 89 are connected. That is, the sixth mode is the same as a case where the terminal 891 and the terminal 892 of the termination switch 89 are connected in the fourth mode. Thus, in the sixth mode, the first sub-line 82a and the second sub-line 82b are connected in series, the second end 822a of the first sub-line 82a is terminated by the second termination circuit 83, the first end 821b of the second sub-line 82b is connected to the third connection terminal 873, and the third connection terminal 873 is terminated by the first termination circuit 84.

In the sixth mode, the first end 821a of the first sub-line 82a and the second end 822b of the second sub-line 82b are connected. That is, a first end of the sub-line 82c that is the series circuit of the first sub-line 82a and the second sub-line 82b is the first end 821b of the second sub-line 82b, and a second end of the sub-line 82c is the second end 822a of the first sub-line 82a. Therefore, in the sixth mode, the first end (first end 821b) of the sub-line 82c is connected to the second termination circuit 83, and the second end (second end 822a) of the sub-line 82c is connected to the first termination circuit 84.

In the directional coupler 8b, in the sixth mode, the first end (first end 821b) of the sub-line 82c is terminated by the second termination circuit 83, and the second end (second end 822a) of the sub-line 82c is terminated by the first termination circuit 84. Thus, the impedance on the sub-line 82c side viewed from the main line 81 side (the signal in the second frequency band transmitted on the main line 81) includes the impedance corresponding to the first termination circuit 84 and the second termination circuit 83. The impedance of the first termination circuit 84 has, for example, magnitude similar to the impedance of the above-described external device (for example, a detector) connected to the third connection terminal 873. Therefore, it is possible to reduce the change in the impedance of the sub-line 82c side viewed from the main line 81 side (the signal in the second frequency band transmitted on the main line 81) between the fourth mode and the fifth mode (during detection), and the sixth mode (during non-detection). As a result, it is possible to reduce the change in the insertion loss of the main line 81 and the change in the phase of the signal transmitted on the main line 81 between a case where detection is performed (during detection) and a case where detection is not performed (during non-detection).

3 Effects

In the directional coupler 8b according to Embodiment 2, as described above, in the third mode, the first end 821a of the first sub-line 82a is terminated by the first termination circuit 84, and the second end 822a of the first sub-line 82a is terminated by the second termination circuit 83. Thus, it is possible to reduce a difference in impedance on the first sub-line 82a side viewed from the main line 81 side (the signal in the first frequency band transmitted on the main line 81) between the first mode and the second mode (during detection), and the third mode (during non-detection). Therefore, it is possible to suppress the fluctuation of the change in the insertion loss of the main line 81 and the change in the phase of the signal transmitted on the main line 81 depending on the presence or absence of detection with respect to the signal in the first frequency band.

In the directional coupler 8b according to Embodiment 2, as described above, in the sixth mode, the first end (first end 821b) of the sub-line 82c is terminated by the first termination circuit 84, and the second end (second end 822a) of the sub-line 82c is terminated by the second termination circuit 83. Thus, it is possible to reduce a difference in impedance on the sub-line 82c side viewed from the main line 81 side (the signal in the second frequency band transmitted on the main line 81) between the fourth mode and the fifth mode (during detection), and the sixth mode (during non-detection). Therefore, it is possible to suppress the fluctuation of the change in the insertion loss of the main line 81 and the change in the phase of the signal transmitted on the main line 81 depending on the presence or absence of detection with respect to the signal in the second frequency band.

In Embodiment 2, there are two usage forms (that is, first sub-line 82*a* and sub-line 82*c*) of a sub-line (first sub-line 82*a* and second sub-line 82*b*) to be used, and the number of first termination circuits 84 that terminate one end (that is, one end connected to the third connection terminal 873) of the sub-line to be used is one. That is, even though the number of usage forms of the sub-line to be used increases, it is possible to prevent an increase in the number of first termination circuits 84 that terminate one end (one end connected to the third connection terminal 873) of the sub-line to be used.

Embodiment 3

A directional coupler 8*c* according to Embodiment 3 will be described with reference to FIGS. 11 and 12. In regard to the directional coupler 8*c* according to Embodiment 3, the same constituent elements as those of the directional coupler 8*b* according to Embodiment 2 are represented by the same reference numerals, and the description thereof will not be repeated.

1 Configuration

The directional coupler 8*c* according to Embodiment 3 is different from the directional coupler 8*b* according to Embodiment 2 in that a phase-shift circuit 90 is further included between the first end 821*a* of the first sub-line 82*a* and the second end 822*b* of the second sub-line 82*b* (in more detail, between the isolation switch 97 and the second end 822*b* of the second sub-line 82*b*).

Figure 11:
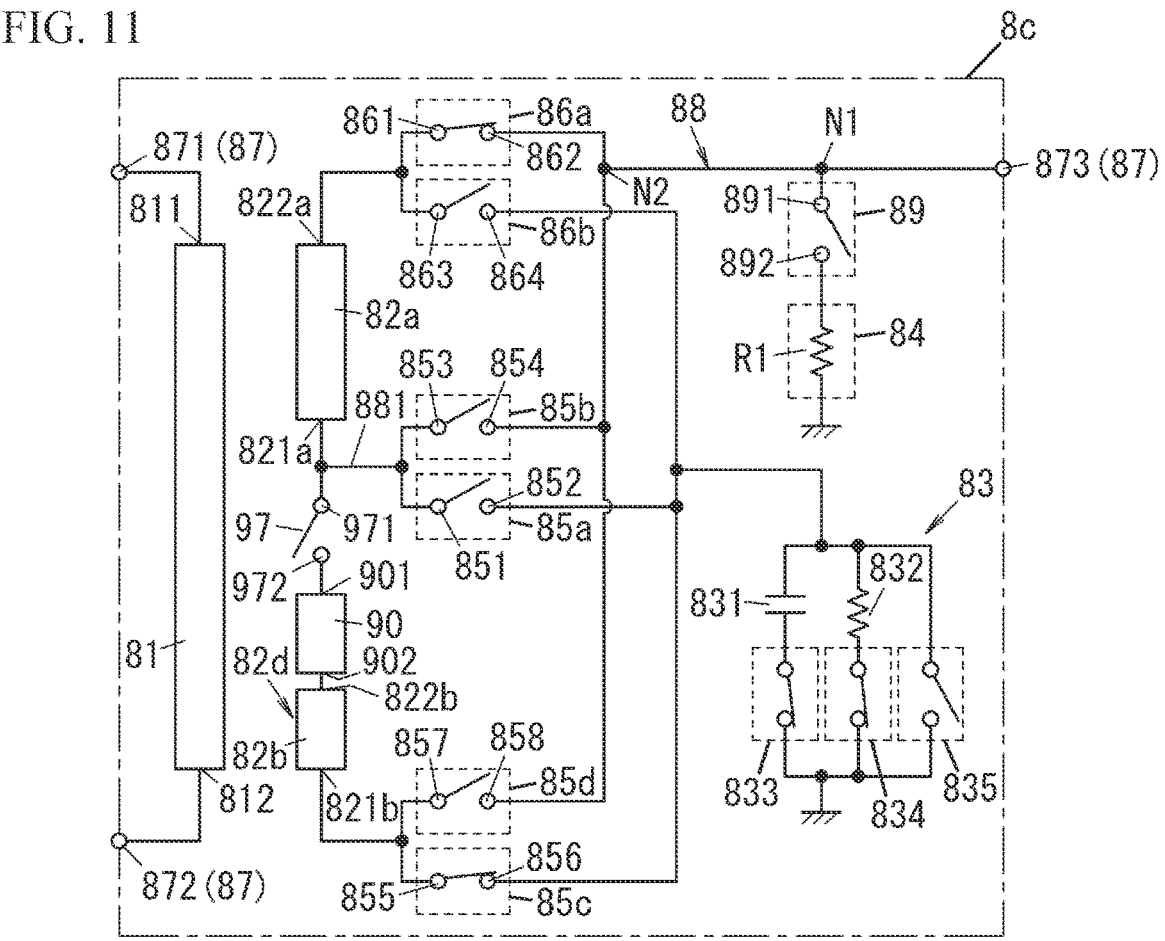
FIG. 11 is a circuit diagram illustrating a directional coupler according to Embodiment 3.
Figure 12:
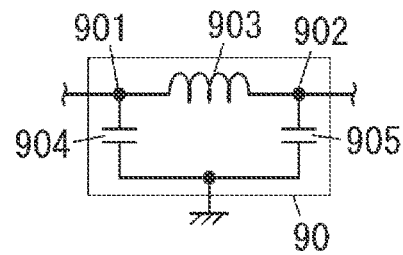
FIG. 12 is a circuit diagram illustrating a phase-shift circuit used in the directional coupler.

As illustrated in FIG. 11, the directional coupler 8*c* according to Embodiment 3 includes the main line 81, the first sub-line 82*a*, the second sub-line 82*b*, a plurality of connection terminals 87, the isolation switch 97, the first selection switch 85*a*, the second selection switch 85*b*, the third selection switch 86*a*, the fourth selection switch 86*b*, the second termination circuit 83, the first termination circuit 84, and the termination switch 89. The directional coupler 8*c* according to Embodiment 3 further includes the fifth selection switch 85*c*, the sixth selection switch 85*d*, and the phase-shift circuit 90.

1.1 Phase-Shift Circuit

The phase-shift circuit 90 is provided between the first end 821*a* of the first sub-line 82*a* and the second end 822*b* of the second sub-line 82*b*. In more detail, a first end 901 of the phase-shift circuit 90 is connected to the terminal 972 of the isolation switch 97. That is, the first end 901 of the phase-shift circuit 90 is connected to the first end 821*a* of the first sub-line 82*a* via the isolation switch 97. A second end 902 of the phase-shift circuit 90 is connected to the second end 822*b* of the second sub-line 82*b*. As illustrated in FIG. 12, the phase-shift circuit 90 has, for example, an inductor 903 and two capacitors 904 and 905. The inductor 903 is connected to the first end 901 and the second end 902 that are both ends of the phase-shift circuit 90. The capacitor 904 is provided between the first end 901 of the phase-shift circuit 90 and the ground. The capacitor 905 is provided between the second end 902 of the phase-shift circuit 90 and the ground.

2 Operation

The directional coupler 8*c* has a first mode, a second mode, a third mode, a fourth mode, a fifth mode, and a sixth mode. Because the first mode, the second mode, and the third mode are the same as in Embodiment 2, hereinafter, the fourth mode, the fifth mode, and the sixth mode will be described.

2.1 Fourth Mode

In the directional coupler 8*c*, in the fourth mode, the isolation switch 97 is connected. In the directional coupler 8*c*, in the fourth mode, the terminal 861 and the terminal 862 of the third selection switch 86*a* are connected, and the terminal 855 and the terminal 856 of the fifth selection switch 85*c* are connected. In the directional coupler 8*c*, in the fourth mode, the terminal 863 and the terminal 864 of the fourth selection switch 86*b* are disconnected, and the terminal 857 and the terminal 858 of the sixth selection switch 85*d* are disconnected. In the directional coupler 8*c*, in the fourth mode, the terminal 851 and the terminal 852 of the first selection switch 85*a* are disconnected, and the terminal 853 and the terminal 854 of the second selection switch 85*b* are disconnected. In the directional coupler 8*c*, in the fourth mode, the terminal 891 and the terminal 892 of the termination switch 89 are disconnected. Thus, in the fourth mode, the first sub-line 82*a*, the second sub-line 82*b*, and the phase-shift circuit 90 are connected in series, the first end 821*b* of the second sub-line 82*b* is connected to the second termination circuit 83, and the second end 822*a* of the first sub-line 82*a* is connected to the third connection terminal 873. In the fourth mode, the termination circuit 84 is isolated from the output path 88.

In the fourth mode, the first end 821*a* of the first sub-line 82*a* and the second end 822*b* of the second sub-line 82*b* are connected via the phase-shift circuit 90. Therefore, a series circuit (hereinafter, referred to as a "sub-line 82*d*") of the first sub-line 82*a* and the second sub-line 82*b* functions as a sub-line.

In the fourth mode, the directional coupler 8*c* detects the signal (detection target signal) in the second frequency band among the signals (forward signals) transmitted on the main line 81 from the first end 811 to the second end 812 in the sub-line 82*d*, and outputs the detection signal from the second end (second end 822*a*) of the sub-line 82*d* to the external device (for example, a detector) via the third connection terminal 873. Here, in Embodiment 3, the phase-shift circuit 90 is provided on a signal path between the first sub-line 82*a* and the second sub-line 82*b* in the sub-line 82*d*. That is, it is possible to adjust the phases of the first sub-line 82*a* and the second sub-line 82*b*. "Adjusting the phases of the first sub-line 82*a* and the second sub-line 82*b*" is adjusting the phases of signals that can be transmitted on the first sub-line 82*a* and the second sub-line 82*b*. In this way, the phases of the first sub-line 82*a* and the second sub-line 82*b* are adjusted, so that it is possible to suppress the leakage of a non-detection target signal (for example, a signal in a frequency band higher than the second frequency band) among the signals transmitted on the main line 81 to the sub-line 82*d*. Therefore, for transmission, reception, or transmission and reception of the signal in the second frequency band in the fourth mode, it is possible to suppress the leakage of a non-detection target signal from the main line 81 to the sub-line 82*d*.

2.2 Fifth Mode

In the directional coupler 8*c*, in the fifth mode, the isolation switch 97 is connected. In the directional coupler 8*c*, in the fifth mode, the terminal 863 and the terminal 864 of the fourth selection switch 86*b* are connected, and the terminal 857 and the terminal 858 of the sixth selection switch 85*d* are connected. In the directional coupler 8*c*, in the fifth mode, the terminal 861 and the terminal 862 of the third selection switch 86a are disconnected, and the terminal 855 and the terminal 856 of the fifth selection switch 85c are disconnected. In the directional coupler 8c, in the fifth mode, the terminal 851 and the terminal 852 of the first selection switch 85a are disconnected, and the terminal 853 and the terminal 854 of the second selection switch 85b are disconnected. In the directional coupler 8c, in the fifth mode, the terminal 891 and the terminal 892 of the termination switch 89 are disconnected. Thus, in the fifth mode, the first sub-line 82a, the second sub-line 82b, and the phase-shift circuit 90 are connected in series, the first end 821b of the second sub-line 82b is connected to the third connection terminal 873, and the second end 822a of the first sub-line 82a is connected to the second termination circuit 83. In the fifth mode, the termination circuit 84 is isolated from the output path 88.

In the fifth mode, the first end 821a of the first sub-line 82a and the second end 822b of the second sub-line 82b are connected via the phase-shift circuit 90. Therefore, the sub-line 82d functions as a sub-line.

In the fifth mode, the directional coupler 8c detects the signal (detection target signal) in the second frequency band among the signals (backward signals) transmitted on the main line 81 from the second end 812 to the first end 811 in the sub-line 82d, and outputs the detection signal from the first end (first end 821b) of the sub-line 82d to the external device (for example, a detector) via the third connection terminal 873. Here, in Embodiment 3, the phase-shift circuit 90 is provided on the signal path between the first sub-line 82a and the second sub-line 82b in the sub-line 82d, and can adjust the phases of the first sub-line 82a and the second sub-line 82b. Thus, it is possible to suppress the leakage of a non-detection target signal (for example, a signal in a frequency band higher than the second frequency band) among the signals transmitted on the main line 81 to the sub-line 82d. Therefore, for transmission, reception, or transmission and reception of the signal in the second frequency band in the fifth mode, it is possible to suppress the leakage of the non-detection target signal from the main line 81 to the sub-line 82d.

2.3 Sixth Mode

In the directional coupler 8c, in the sixth mode, the isolation switch 97 is connected. In the directional coupler 8c, in the sixth mode, the terminal 861 and the terminal 862 of the third selection switch 86a are connected, and the terminal 855 and the terminal 856 of the fifth selection switch 85c are connected. In the directional coupler 8b, in the sixth mode, the terminal 863 and the terminal 864 of the fourth selection switch 86b are disconnected, and the terminal 857 and the terminal 858 of the sixth selection switch 85d are disconnected. In the directional coupler 8b, in the sixth mode, the terminal 851 and the terminal 852 of the first selection switch 85a are disconnected, and the terminal 853 and the terminal 854 of the second selection switch 85b are disconnected. In the directional coupler 8c, in the sixth mode, the terminal 891 and the terminal 892 of the termination switch 89 are connected. Thus, in the sixth mode, the first sub-line 82a, the second sub-line 82b, and the phase-shift circuit 90 are connected in series, the first end 821b of the second sub-line 82b is connected to the second termination circuit 83, the second end 822a of the first sub-line 82a is connected to the third connection terminal 873, and the third connection terminal 873 is terminated by the first termination circuit 84.

In the sixth mode, the first end 821a of the first sub-line 82a and the second end 822b of the second sub-line 82b are connected via the phase-shift circuit 90. That is, the first end of the sub-line 82d that is the series circuit of the first sub-line 82a and the second sub-line 82b is the first end 821b of the second sub-line 82b, and the second end of the sub-line 82d is the second end 822a of the first sub-line 82a. Therefore, in the sixth mode, the first end (first end 821b) of the sub-line 82d is connected to the second termination circuit 83, and the second end (second end 822a) of the sub-line 82d is connected to the first termination circuit 84.

In the directional coupler 8c, in the sixth mode, the first end (first end 821b) of the sub-line 82d is terminated by the second termination circuit 83, and the second end (second end 822a) of the sub-line 82d is terminated by the first termination circuit 84. Thus, the impedance on the sub-line 82d side viewed from the main line 81 side (the signal (detection target signal) in the second frequency band transmitted on the main line 81) includes the impedance corresponding to the first termination circuit 84 and the second termination circuit 83. The impedance of the first termination circuit 84 has, for example, magnitude similar to the impedance of the above-described external device (that is, a detector) connected to the third connection terminal 873. Therefore, it is possible to reduce the change in the impedance on the sub-line 82d viewed from the main line 81 side (the signal in the second frequency band transmitted on the main line 81) between the fourth mode and the fifth mode (during detection), and the sixth mode (during non-detection). As a result, it is possible to suppress the fluctuation of the change in the insertion loss of the main line 81 and the change in the phase of the signal transmitted on the main line 81 depending on the presence or absence of detection with respect to the signal in the second frequency band.

In Embodiment 3, the phase-shift circuit 90 is provided on the signal path between the first sub-line 82a and the second sub-line 82b in the sub-line 82d, and can adjust the phases of the first sub-line 82a and the second sub-line 82b. Thus, it is possible to suppress the leakage of a non-detection target signal (for example, a signal in a frequency band higher than the second frequency band) among the signals transmitted on the main line 81 to the sub-line 82d. Therefore, for transmission, reception, or transmission and reception of the signal in the second frequency band in the sixth mode, it is possible to suppress the leakage of the non-detection target signal from the main line 81 to the sub-line 82d.

3 Effects

In the directional coupler 8c according to Embodiment 3, as described above, in the third mode, the first end 821a of the first sub-line 82a is terminated by the second termination circuit 83, and the second end 822a of the first sub-line 82a is terminated by the first termination circuit 84. Thus, it is possible to reduce the difference in impedance on the first sub-line 82a side viewed from the main line 81 (the signal in the first frequency band transmitted on the main line 81) between the first mode and the second mode (during detection), and the third mode (during non-detection). Therefore, it is possible to suppress the fluctuation of the change in the insertion loss of the main line 81 and the change in the phase of the signal transmitted on the main line 81 depending on the presence or absence of detection with respect to the signal in the first frequency band.

In the directional coupler 8c according to Embodiment 3, as described above, in the sixth mode, the first end (first end 821b) of the sub-line 82d is terminated by the second termination circuit 83, and the second end (second end 822a) of the sub-line 82d is terminated by the first termination circuit 84. Thus, it is possible to reduce the difference in impedance on the sub-line 82*d* side viewed from the main line 81 side (the signal in the second frequency band transmitted on the main line 81) between the fourth mode and the fifth mode (during detection), and the sixth mode (during non-detection). Therefore, it is possible to suppress the fluctuation of the change in the insertion loss of the main line 81 and the change in the phase of the signal transmitted on the main line 81 depending on the presence or absence of detection with respect to the signal in the second frequency band.

In the directional coupler 8*c* according to Embodiment 3, the phase-shift circuit 90 is provided on the signal path between the first sub-line 82*a* and the second sub-line 82*b*, and can adjust the phases of the first sub-line 82*a* and the second sub-line 82*b*. Therefore, for transmission, reception, or transmission and reception of the signal in the second frequency band, it is possible to suppress the leakage of the non-detection target signal (for example, a signal in a frequency band higher than the second frequency band) from the main line 81 to the sub-line.

4 Modification Examples

The directional coupler 8*c* may include a phase-shift circuit 90*a* or may include a phase-shift circuit 90*b*, instead of the phase-shift circuit 90.

Figure 13:
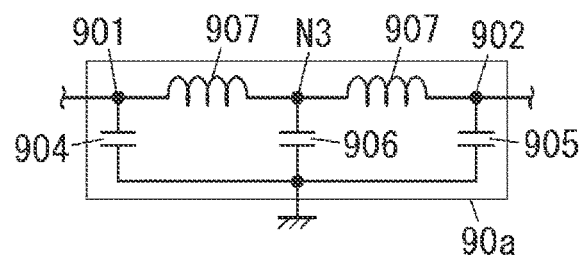
FIG. 13 is a circuit diagram illustrating a modification example of a phase-shift circuit used in the directional coupler.

As illustrated in FIG. 13, the phase-shift circuit 90*a* has, for example, a plurality (in the example illustrated in the drawing, two) of inductors 907 and a plurality (in the example illustrated in the drawing, three) of capacitors 904 to 906. The plurality of inductors 907 are connected in series with each other, and are connected between both ends (first end 901 and second end 902) of the phase-shift circuit 90*a*. The capacitor 904 is connected between the first end 901 of the phase-shift circuit 90*a* and the ground. The capacitor 905 is connected between the second end 902 of the phase-shift circuit 90*a* and the ground. The capacitor 906 is connected between a mutual connection point N3 of the two inductors 907 and the ground.

Figure 14:
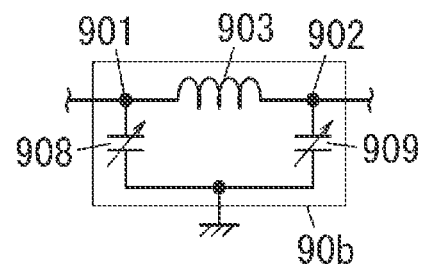
FIG. 14 is a circuit diagram illustrating another modification example of a phase-shift circuit used in the directional coupler.

As illustrated in FIG. 14, the phase-shift circuit 90*b* has, for example, an inductor 903 and two variable capacitors 908 and 909. The inductor 903 is connected between both ends (first end 901 and second end 902) of the phase-shift circuit 90*b*. The variable capacitor 908 is connected between the first end 901 of the phase-shift circuit 90*b* and the ground. The variable capacitor 909 is connected between the second end 902 of the phase-shift circuit 90*b* and the ground.

Also in such cases, as with the phase-shift circuit 90, it is possible to adjust the phases of the first sub-line 82*a* and the second sub-line 82*b*, and as a result, it is possible to suppress the leakage of a non-detection target signal from the main line 81 to the sub-line 82*d* in the LB mode.

Embodiment 4

Figure 15:
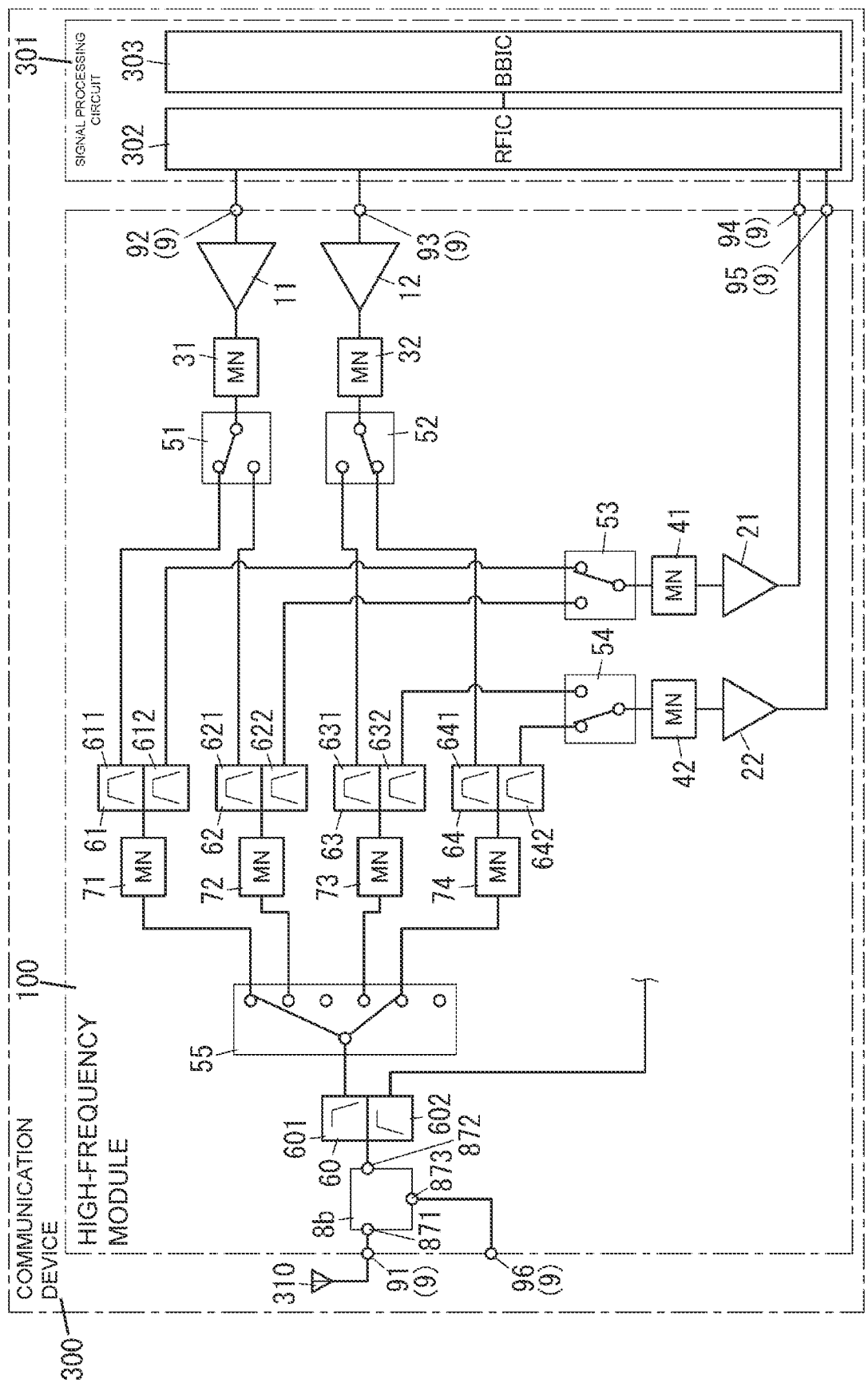
FIG. 15 is a circuit diagram of a high-frequency module and a communication device according to Embodiment 4.

1 High-Frequency Module and Communication Device 1.1 Configuration of High-Frequency Module The configuration of a high-frequency module 100 according to Embodiment 4 will be described with reference to FIG. 15. As illustrated in FIG. 15, the high-frequency module 100 is used in, for example, a communication device 300. The communication device 300 is, for example, a mobile phone, such as a smartphone. The communication device 300 is not limited to a mobile phone, and may be, for example, a wearable terminal, such as a smart watch. The high-frequency module 100 is, for example, a module that can support a fourth generation mobile communication (4G) standard or a fifth generation mobile communication (5G) standard. The 4G standard is, for example, a Third Generation Partnership Project (3GPP, Registered Trademark,) or Long Term Evolution (LTE, Registered Trademark) standard. The 5G standard is, for example, 5G New Radio (NR). The high-frequency module 100 is, for example, a module that can support carrier aggregation and dual connectivity.

The communication device 300 performs communication in a plurality of communication bands. In more detail, the communication device 300 performs transmission in the plurality of communication bands and reception of reception signals in the plurality of communication bands.

Parts of the transmission signals and the reception signals in the plurality of communication bands are frequency division duplex (FDD) signals. The transmission signals and the reception signals in the plurality of communication bands are not limited to FDD signals, and may be time division duplex (TDD) signals. The FDD is a radio communication technique in which transmission and reception are performed in such a manner that different frequency bands are assigned to transmission and reception in radio communication. The TDD is a radio communication technique in which transmission and reception are switched and performed at each time in such a manner that the same frequency band is assigned to transmission and reception in radio communication.

As illustrated in FIG. 15, the high-frequency module 100 includes a first power amplifier 11, a second power amplifier 12, a first switch 51, a second switch 52, and a plurality (in the example illustrated in the drawing, five) of filters 60 to 64. The high-frequency module 100 further includes a first output matching circuit 31, a second output matching circuit 32, and a plurality (in the example illustrated in the drawing, four) of matching circuits 71 to 74. The high-frequency module 100 further includes a first low noise amplifier 21, a second low noise amplifier 22, a first input matching circuit 41, and a second input matching circuit 42. The high-frequency module 100 further includes a third switch 53, a fourth switch 54, and a fifth switch 55. The high-frequency module 100 further includes the directional coupler 8*b*. The high-frequency module 100 further includes a plurality of external connection terminals 9.

For example, the filter 61 is a duplexer having a transmission filter 611 and a reception filter 612, and an acoustic wave filter of a surface acoustic wave (SAW), a bulk acoustic wave (BAW), or the like may be used. The filter 60 is a diplexer having a plurality of filters 601 and 602. Each of the plurality of filters 601 and 602 is, for example, an inductor (L)-capacitor (C) filter. The high-frequency module 100 includes the external connection terminals 9 having an antenna terminal 91, two signal input terminals 92 and 93, two signal output terminals 94 and 95, a coupling terminal 96, and a plurality of ground terminals.

The coupling terminal 96 is a terminal for outputting a signal (detection signal) from the directional coupler 8*b* to the external device (for example, a detector). The coupling terminal 96 is connected to the third connection terminal 873 (see FIG. 10) of the directional coupler 8*b*.

The plurality of ground terminals are terminals that are electrically connected a ground electrode of an external substrate (not illustrated) included in the communication device 300 and that are given a ground potential. In the high-frequency module 100, the plurality of ground terminals are connected to a ground layer (not illustrated) of a mounting substrate 10. The ground layer is a circuit ground of the high-frequency module 100.

The directional coupler 8b is the same as that described in Embodiment 2 described above. As described above, the directional coupler 8b has the first connection terminal 871, the second connection terminal 872, and the third connection terminal 873. The first connection terminal 871 is connected to the antenna terminal 91. The second connection terminal 872 is connected to an input/output portion of the filter 60. The third connection terminal 873 is connected to the coupling terminal 96. In Embodiment 2, the directional coupler 8b is provided in a partial section of a signal path that connects the antenna terminal 91 and the antenna switch 55, and detects a high-frequency signal transmitted on the partial section.

1.2 Configuration of Communication Device

Next, the configuration of the communication device 300 according to Embodiment 4 will be described with reference to FIG. 15.

As illustrated in FIG. 15, the communication device 300 includes the high-frequency module 100, an antenna 310, and a signal processing circuit 301. The communication device 300 further includes a circuit board on which the high-frequency module 100 is mounted. The circuit board is, for example, a printed wiring board. The circuit board has a ground electrode that is given a ground potential.

The signal processing circuit 301 is connected to the high-frequency module 100 and executes signal processing on a high-frequency signal. The signal processing circuit 301 includes an RF signal processing circuit 302 that is a radio frequency integrated circuit (RFIC), and a baseband signal processing circuit 303 that is a baseband integrated circuit (BBIC). The RF signal processing circuit 302 also has a function as a control unit that controls the first to fifth switches 51 to 55, the first and second power amplifiers 11 and 12, and the first and second low noise amplifiers 21 and 22 in the high-frequency module 100.

2 Structure of High-Frequency Module

Next, the structure of the high-frequency module 100 will be described with reference to FIGS. 16 and 17. As illustrated in FIGS. 16 and 17, the high-frequency module 100 includes the mounting substrate 10, a plurality of electronic components, and a plurality of external connection terminals 9. The high-frequency module 100 further includes a first resin layer 16 and a metal electrode layer 17. The high-frequency module 100 can be electrically connected to a mother board of the communication device 300, such as a mobile phone or communication equipment.

2.1 Mounting Substrate

As illustrated in FIGS. 16 and 17, the mounting substrate 10 has a first principal surface 101 and a second principal surface 102. The first principal surface 101 and the second principal surface 102 are opposed to each other in a thickness direction D1 of the mounting substrate 10. In a case where the high-frequency module 100 is provided on the external substrate, the second principal surface 102 faces a principal surface of the external substrate on the mounting substrate 10 side. The mounting substrate 10 is a double-sided mounting substrate in which a plurality of electronic components are mounted on the first principal surface 101 and the second principal surface 102.

The mounting substrate 10 is a multilayer substrate in which a plurality of dielectric layers are laminated. The mounting substrate 10 has a plurality of conductive layers and a plurality of via conductors (including through-electrodes). The plurality of dielectric layers include a first layer 10a, a second layer 10b, a third layer 10c, a fourth layer 10d, and a fifth layer 10e. The plurality of conductive layers include the ground layer at a ground potential. The plurality of via conductors are used for the electrical connection between the elements respectively disposed on the first principal surface 101 and the second principal surface 102 and the conductive layers of the mounting substrate 10. The plurality of via conductors are used for the electrical connection between the elements disposed on the first principal surface 101 and the elements disposed on the second principal surface 102 and for the electrical connection between the conductive layers of the mounting substrate 10 and the external connection terminals 9.

A plurality (in the example illustrated in the drawing, nine) of external connection terminals 9 are disposed on one surface (back surface) of the first layer 10a. A conductor pattern portion that configures the first sub-line 82a is formed on one surface (front surface) of the second layer 10b. A conductor pattern portion that configures the main line 81 is formed on one surface (front surface) of the third layer 10c. A conductor pattern portion that configures the second sub-line 82b is formed on one surface (front surface) of the fourth layer 10d. A plurality (in the example illustrated in the drawing, four) of terminals 103 to 106 are formed on the fifth layer 10e.

The terminal 103 corresponds to the first end 821a of the first sub-line 82a and is connected to the first end 821a of the first sub-line 82a via the via conductor (not illustrated). The terminal 104 corresponds to the second end 822a of the first sub-line 82a and is connected to the second end 822a of the first sub-line 82a via the via conductor (not illustrated). The terminal 105 corresponds to the second end 822b of the second sub-line 82b and is connected to the second end 822b of the second sub-line 82b via the via conductor (not illustrated). The terminal 106 corresponds to the first end 821b of the second sub-line 82b and is connected to the first end 821b of the second sub-line 82b via the via conductor (not illustrated).

In the mounting substrate 10, the first layer 10a, the second layer 10b, the third layer 10c, the fourth layer 10d, and the fifth layer 10e are laminated in this order from the lower side. Thus, the main line 81, the first sub-line 82a, and the second sub-line 82b are provided inside the mounting substrate (multilayer substrate) 10. An IC chip 13 is disposed on the first principal surface 101 (a front surface of the fifth layer 10e) of the mounting substrate 10. The IC chip 13 is an IC chip (IC component) including at least the first termination circuit 84 and the termination switch 89. As described above, the main line 81, the first sub-line 82a, and the second sub-line 82b are provided inside the mounting substrate 10, and the IC chip 13 is disposed on the first principal surface 101 of the mounting substrate 10, whereby it is possible to restrain the electromagnetic field coupling between the main line 81 and the first termination circuit 84.

The IC chip 13 includes the first termination circuit 84 and the termination switch 89, whereby the first termination circuit 84 and the termination switch 89 are close to each other, so that it is possible to adjust the impedance of the first termination circuit 84 with high accuracy. The IC chip 13 further includes the fifth switch (antenna switch) 55, the first selection switch 85a, the second selection switch 85b, the third selection switch 86a, the fourth selection switch 86b, the fifth selection switch 85c, and the sixth selection switch 85d. That is, the fifth switch 55 is integrated with the first selection switch 85a, the second selection switch 85b, the third selection switch 86a, the fourth selection switch 86b, the fifth selection switch 85c, and the sixth selection switch 85d.

2.2 Electronic Components

The plurality of electronic components include a first group of electronic components and a second group of electronic components. The first group of electronic components is disposed on the first principal surface 101 of the mounting substrate 10. The first group of electronic components includes the first power amplifier 11, the second power amplifier 12, the plurality of filters 60 to 64, the first output matching circuit 31, the second output matching circuit 32, the first input matching circuit 41, the second input matching circuit 42, and the IC chip 13. The second group of electronic components is disposed on the second principal surface 102 of the mounting substrate 10. The second group of electronic components includes the first low noise amplifier 21 and the second low noise amplifier 22.

The first switch 51, the second switch 52, the third switch 53, the fourth switch 54, the matching circuits 71 to 74, and the second termination circuit 83, which are illustrated in neither FIG. 16 nor FIG. 17, may be disposed on any of the first principal surface 101 and the second principal surface 102 of the mounting substrate 10.

2.3 External Connection Terminal

The plurality of external connection terminals 9 are terminals for electrically connecting the mounting substrate 10 and the external substrate (not illustrated). The plurality of external connection terminals 9 are disposed on the second principal surface 102 of the mounting substrate 10.

2.4 Resin Layer

The first resin layer 16 is disposed on the first principal surface 101 of the mounting substrate 10. The first resin layer 16 covers the first group of electronic components disposed on the first principal surface 101 of the mounting substrate 10. The first resin layer 16 contains resin (for example, epoxy resin). The first resin layer 16 may contain a filler in addition to resin.

2.5 Metal Electrode Layer

The metal electrode layer 17 has conductivity. The metal electrode layer 17 is provided for the purpose of the electromagnetic shield of the inside and the outside of the high-frequency module 100. Although the metal electrode layer 17 has a multilayer structure in which a plurality of metal layers are laminated, the metal electrode layer 17 is not limited to a multilayer structure, and may be one metal layer. One metal layer contains one or a plurality of kinds of metal. The metal electrode layer 17 covers a principal surface of the first resin layer 16 on an opposite side to the mounting substrate 10 side, an outer peripheral surface of the first resin layer 16, an outer peripheral surface of the mounting substrate 10, and an outer peripheral surface of the second resin layer. The metal electrode layer 17 is in contact with at least a part of an outer peripheral surface of the ground layer (not illustrated) of the mounting substrate 10. Thus, it is possible to make a potential of the metal electrode layer 17 equal to a potential of the ground layer.

3 Layout of High-Frequency Module

Next, the layout of the high-frequency module 100 will be described.

As illustrated in FIG. 17, in the high-frequency module 100, the main line 81, the first sub-line 82a, and the second sub-line 82b overlap the IC chip 13 in plan view seen in the thickness direction D1 (see FIG. 16) of the mounting substrate 10. Thus, it is possible to shorten a connection distance between the IC chip 13 and the directional coupler 8b, and as a result, it is possible to suppress the occurrence of an unnecessary inductor. The IC chip 13 may overlap any one or two of the main line 81, the first sub-line 82a, and the second sub-line 82b in plan view seen in the thickness direction D1 of the mounting substrate 10. That is, the IC chip 13 may overlap at least one of the main line 81, the first sub-line 82a, and the second sub-line 82b in plan view seen in the thickness direction D1 of the mounting substrate 10.

4 Effects

Because the high-frequency module 100 and the communication device 300 according to Embodiment 4 include the directional coupler 8b as described above, it is possible to suppress the difference in insertion loss and phase of the signal transmitted on the main line 81 of the directional coupler 8b between the first mode and the second mode where detection is performed, and the third mode where detection is not performed, and between the fourth mode and the fifth mode where detection is performed, and the sixth mode where detection is not performed.

In the high-frequency module 100 according to Embodiment 4, as described above, the fifth switch (antenna switch) 55 is included in the IC chip 13 along with the first selection switch 85a, the second selection switch 85b, the third selection switch 86a, the fourth selection switch 86b, the fifth selection switch 85c, and the sixth selection switch 85d, and is integrated with the first selection switch 85a, the second selection switch 85b, the third selection switch 86a, the fourth selection switch 86b, the fifth selection switch 85c, and the sixth selection switch 85d. Thus, it is possible to achieve a reduction in size of the high-frequency module 100, compared to a case where the fifth switch 55 and the first selection switch 85a, the second selection switch 85b, the third selection switch 86a, the fourth selection switch 86b, the fifth selection switch 85c, and the sixth selection switch 85d are included in separate IC chips. The main line 81, the first sub-line 82a, and the second sub-line 82b overlap the IC chip 13 in plan view seen in the thickness direction D1 of the mounting substrate 10. Thus, it is possible to shorten a connection distance between the IC chip 13 and the directional coupler 8b, and as a result, it is possible to suppress the occurrence of an unnecessary inductor.

OTHER MODIFICATION EXAMPLES

Embodiments 1 to 4 and the like described above each are just one of various embodiments of the present disclosure. Embodiments 1 to 4 and the like may be modified into various forms according to design or the like as long as the possible benefit of the present disclosure can be achieved, and different constituent elements of different embodiments may be suitably combined.

The communication device 300 and the high-frequency module 100 according to Embodiment 4 may include any one of the directional couplers 8 and 8c, instead of the directional coupler 8b.

In the directional coupler 8 according to Embodiment 1, the number of sub-lines 82 is one, and in the directional couplers 8b and 8c according to Embodiments 2 to 4, the number of sub-lines 82 is two; however, the number of sub-lines 82 is not limited to one and two, and may be, for example, three or more.

The directional couplers 8, 8b, and 8c according to Embodiments 1 to 4 are bidirectional couplers that can detect each of the high-frequency signal transmitted on the main line 81 from the first end 811 to the second end 812 and the high-frequency signal transmitted on the main line 81 from the second end 812 to the first end 811, but may be a directional coupler that can detect only the high-frequency signal transmitted on the main line 81 from the first end 811 to the second end 812.

ASPECTS

In the present specification, the following aspects are disclosed.

A directional coupler (8; 8b; 8c) according to a first aspect includes a main line (81), a sub-line (82; 82a), an output terminal (873), a first termination circuit (84), and a termination switch (89). The sub-line (82; 82a) includes a first end (821; 821a) and a second end (822; 822a). The output terminal (873) is connected to one end of the first end (821; 821a) and the second end (822; 822a). The first termination circuit (84) connects a first output path (88), which connects the one end and the output terminal (873), to a ground. The termination switch (89) switches between connection and non-connection between the first output path (88) and the first termination circuit (84).

According to this configuration, the first output path (88) and the first termination circuit (84) are connected by the termination switch (89) during non-detection, so that the output terminal (873) can be terminated by the first termination circuit (84). That is, one end (that is, one end connected to the output terminal (873)) of the sub-line (82) can be terminated by the first termination circuit (84). Thus, it is possible to reduce the change in the impedance of the sub-line (82; 82a) with respect to the signal transmitted on the main line (81) between during detection and during non-detection.

Therefore, it is possible to reduce the change in the insertion loss of the main line (81) and the change in the phase of the signal transmitted on the main line (81) between during detection and during non-detection.

In a directional coupler (8) according to a second aspect, in the first aspect, the first termination circuit (84; 84a; 84b; 84c; 84d) includes a resistor (R1; 8431; 8434) connected in series with the termination switch (89).

According to this configuration, the termination resistance of the first termination circuit (84; 84b; 84c; 84d) is easily set to a desired value. Thus, it is possible to easily form the first termination circuit (84; 84b; 84c; 84d) at a 50Ω termination that is generally frequently used.

In a directional coupler (8) according to a third aspect, in the second aspect, the first termination circuit (84a; 84b; 84c; 84d) further includes at least one of an inductor (8433, 8436) and a capacitor (8432, 8435).

According to this configuration, it is possible to give frequency characteristics to the first termination circuit (84a to 84d). Thus, it is possible to improve the characteristics of the signal transmitted on the main line (81) within a given frequency range.

In a directional coupler (8) according to a fourth aspect, in the third aspect, the first termination circuit (84c; 84d) includes the resistor (8431, 8434), the inductor (8433, 8436), and the capacitor (8432, 8435). The resistor (8431, 8434), the inductor (8433, 8436), and the capacitor (8432, 8435) are connected in parallel with one another.

According to this configuration, it is possible to give frequency characteristics to the first termination circuit (84c; 84d).

In a directional coupler (8) according to a fifth aspect, in the third aspect, the first termination circuit (84b) includes the resistor (8431), the inductor (8433), and the capacitor (8432). The resistor (8431) and the capacitor (8432) are connected in parallel with each other. The inductor (8433) is connected in series with the resistor (8431) and the capacitor (8432).

According to this configuration, it is possible to give frequency characteristics to the first termination circuit (84).

A directional coupler (8, 8b, 8c) according to a sixth aspect includes a second termination circuit (83), a first selection switch (85a), a second selection switch (85b), a third selection switch (86a), and a fourth selection switch (86b) in any one of the first to fifth aspects. The second termination circuit (83) connects the other end of the first end (821; 821a) and the second end (822; 822a) to the ground. The first selection switch (85a) switches between connection and non-connection between the first end (821; 821a) and the second termination circuit (83). The second selection switch (85b) switches between connection and non-connection between the first end (821; 821a) and the output terminal (873). The third selection switch (86a) switches between connection and non-connection between the second end (822; 822a) and the output terminal (873). The fourth selection switch (86b) switches between connection and non-connection between the second end (822; 822a) and the second termination circuit (83).

According to this configuration, it is possible to reduce the change in the insertion loss of the main line (81) and the change in the phase of the signal transmitted on the main line (81) between during detection and during non-detection with respect to the forward signal (S1) and the backward signal (S3) transmitted on the main line (81).

In a directional coupler (8; 8b; 8c) according to a seventh aspect, in the sixth aspect, the first selection switch (85a) and the second selection switch (85b) connect the first end (821; 821a) to one of the output terminal (873) and the second termination circuit (83) during non-detection. The third selection switch (86a) and the fourth selection switch (86b) connect the second end (822; 822a) to the other of the output terminal (873) and the second termination circuit (83). The termination switch (89) connects the first termination circuit (84) and the first output path (88).

According to this configuration, in the circuit configuration of the directional coupler (8; 8b; 8c) of the sixth aspect, during non-detection, one end (that is, one end connected to the output terminal (873)) of the sub-line (82; 82a) can be terminated by the first termination circuit (84), and the other end of the sub-line (82; 82a) can be terminated by the second termination circuit (83).

A directional coupler (8b; 8c) according to an eighth aspect further includes a second sub-line (82b) that is connected in series with a first sub-line (82a) as the sub-line (82) in any one of the first to seventh aspects. The first termination circuit (84) connects a second output path (88b) to the ground. The second output path (88b) connects one of both ends of a series circuit (82c; 82d) of the first sub-line (82a) and the second sub-line (82b) and the output terminal (873). The termination switch (89) switches between connection and non-connection between the second output path (88b) and the first termination circuit (84).

According to this configuration, in a case where detection is not performed with respect to a frequency band as a target of detection using the first sub-line (82a), the first output path (88) and the first termination circuit (84) are connected by the termination switch (89), so that one end (that is, one end connected to the output terminal (873)) of the first sub-line (82*a*) can be terminated by the first termination circuit (84). In a case where detection is not performed with respect to a frequency band as a target of detection using the series circuit (82*c*; 82*d*) of the first sub-line (82*a*) and the second sub-line (82*b*), the second output path (88*b*) and the first termination circuit (84) are connected by the termination switch (89), so that one end (that is, one end connected to the output terminal (873)) of the series circuit (82*c*; 82*d*) can be terminated by the termination circuit (84). Therefore, even though the number of sub-lines (first sub-line (82*a*) and series circuit (82*c*; 82*d*)) to be used increases, it is possible to prevent an increase in the number of first termination circuits (84) that terminate one end (that is, one end connected to the output terminal (873)) of a sub-line to be used.

A directional coupler (8*b*; 8*c*) according to a ninth aspect further includes a phase-shift circuit (90) that is connected between one end (821*a*) of the first sub-line (82*a*) and one end (822*b*) of the second sub-line (82*b*) in the eighth aspect.

According to this configuration, in a case where the series circuit (82*c*; 82*d*) of the first sub-line (82*a*) and the second sub-line (82*b*) is used in detection, it is possible to adjust the phase of a signal transmitted on the first sub-line (82*a*) and the phase of a signal transmitted on the second sub-line (82*b*) by the phase-shift circuit (90). Thus, in a case where the series circuit (82*c*; 82*d*) is used in detection, it is possible to suppress the leakage of a non-detection target signal from the main line (81) to the series circuit (82*c*; 82*d*).

A directional coupler (8; 8*b*; 8*c*) according to a tenth aspect further includes a multilayer substrate (10) having a plurality of dielectric layers (10*a* to 10*e*) in any one of the first to ninth aspects. The main line (81) is provided inside the multilayer substrate (10). An IC chip (13) including the first termination circuit (84), a second termination circuit (83) that connects the other end of the first end (821; 821*a*) and the second end (822; 822*a*) to the ground, and the termination switch (89) is disposed on the multilayer substrate (10).

According to this configuration, it is possible to restrain the electromagnetic field coupling of the first termination circuit (84) and the second termination circuit (83), and the main line (81). Because the first termination circuit (84) and the termination switch (89) are close to each other, it is possible to reduce an influence of the impedance on a path between the first termination circuit (84) and the termination switch (89), and to adjust the impedance of the first termination circuit (84) with high accuracy.

In a directional coupler (8; 8*b*; 8*c*) according to an eleventh aspect, in the tenth aspect, the IC chip (13) overlaps the main line (81) in plan view seen in a thickness direction (D1) of the multilayer substrate (10).

According to this configuration, it is possible to shorten a connection distance between the main line (81) and the IC chip (13). Therefore, it is possible to suppress the occurrence of an unnecessary inductor.

A high-frequency module (100) according to a twelfth aspect includes the directional coupler (8; 8*b*; 8*c*) according to any one of the first to eleventh aspects, an antenna terminal (91), a plurality of filters (a plurality of transmission filters (611, 621, 631, 641) and a plurality of reception filters (6121, 622, 632, 642)), and an antenna switch (55). The antenna switch (55) switches between connection and non-connection between a signal path to the antenna terminal (91) and the plurality of filters. The main line (81) of the directional coupler (8; 8*b*; 8*c*) configures a partial section of the signal path.

According to this configuration, in the high-frequency module (100) including the directional coupler (8; 8*b*; 8*c*), the antenna terminal (91), the plurality of filters (the plurality of transmission filters (611, 621, 631, 641) and the plurality of reception filters (612, 622, 632, 642)), and the antenna switch (55), it is possible to reduce the change in the insertion loss of the main line (81) and the change in the phase of the signal transmitted on the main line (81) between during detection (that is, a case where detection is performed) and during non-detection (that is, a case where detection is not performed).

In a high-frequency module (100) according to a thirteenth aspect, in the twelfth aspect, the antenna switch (55) is integrated with the termination switch (89) of the directional coupler (8; 8*b*; 8*c*).

According to this configuration, it is possible to reduce the size of the high-frequency module (100).

A communication device (300) according to a fourteenth aspect includes the high-frequency module (100) according to the twelfth or thirteenth aspect, and a signal processing circuit (301). The signal processing circuit (301) is connected to the high-frequency module (100) and executes signal processing on a high-frequency signal.

According to this configuration, in the communication device (300) including the high-frequency module (100) and the signal processing circuit (301), it is possible to reduce the change in the insertion loss of the main line (81) and the change in the phase of the signal transmitted on the main line (81) between during detection (that is, a case where detection is performed) and during non-detection (that is, a case where detection is not performed).

What is claimed is:

1. A directional coupler comprising:
   a main line;
   a sub-line having a first end and a second end;
   an output terminal that is connected to the second end;
   a first termination circuit that connects a first output path to ground, the first output path connecting the second end to the output terminal; and
   a termination switch that selectively connects the first output path and the first termination circuit,
   wherein the first termination circuit is connected between the second end and the output terminal, closer to the output terminal than a third selection switch connected to the second end.

2. The directional coupler according to claim 1, wherein the first termination circuit comprises a resistor that is connected in series with the termination switch.

3. The directional coupler according to claim 2, wherein the first termination circuit further comprises an inductor or a capacitor.

4. The directional coupler according to claim 3,
   wherein the first termination circuit comprises the resistor, the inductor, and the capacitor, and
   wherein the resistor, the inductor, and the capacitor are connected in parallel with each other.

5. The directional coupler according to claim 3,
   wherein the first termination circuit comprises the resistor, the inductor, and the capacitor,
   wherein the resistor and the capacitor are connected in parallel with each other, and
   wherein the inductor is connected in series with the resistor and the capacitor.

6. The directional coupler according to claim 1, further comprising:
   a second termination circuit that connects the first end to ground;
   a first selection switch configured to selectively connect the first end and the second termination circuit;

a second selection switch configured to selectively connect the first end and the output terminal;

the third selection switch is configured to selectively connect the second end and the output terminal; and a fourth selection switch configured to selectively connect the second end and the second termination circuit.

7. The directional coupler according to claim 6, wherein during non-detection of a signal supplied from an input port of the main line:

the first selection switch and the second selection switch connect the first end to one of the output terminal and the second termination circuit, the third selection switch and the fourth selection switch connect the second end to the other of the output terminal and the second termination circuit, and the termination switch connects the first termination circuit and the first output path.

8. The directional coupler according to claim 1, further comprising:

a second sub-line that is connected in series with the first end of the sub-line, wherein the first termination circuit connects a second output path to ground, the second output path connecting an end of the second sub-line and the output terminal, and wherein the termination switch is configured to selectively connect the second output path and the first termination circuit.

9. The directional coupler according to claim 8, further comprising:

a phase-shift circuit that is connected between the first sub-line and the second sub-line.

10. The directional coupler according to claim 1, further comprising:

a multilayer substrate having a plurality of dielectric layers, wherein the main line is inside the multilayer substrate, and wherein an integrated circuit (IC) chip comprising the first termination circuit, a second termination circuit that connects the first end of the sub-line to ground, and the termination switch, is on the multilayer substrate.

11. The directional coupler according to claim 10, wherein the IC chip overlaps the main line in a plan view of the multilayer substrate.

12. A high-frequency module comprising:

the directional coupler according to claim 1;

an antenna terminal;

a plurality of filters; and an antenna switch configured to selectively connect a signal path to the antenna terminal and the plurality of filters, wherein the main line of the directional coupler is part of the signal path.

13. The high-frequency module according to claim 12, wherein the antenna switch is integrated with the termination switch of the directional coupler.

14. A communication device comprising:

the high-frequency module according to claim 12; and a signal processing circuit that is connected to the high-frequency module and that is configured to process a high-frequency signal.

\* \* \* \* \*